United States Patent [19]
Emery et al.

[11] Patent Number: 5,530,874
[45] Date of Patent: Jun. 25, 1996

[54] NETWORK ADAPTER WITH AN INDICATION SIGNAL MASK AND AN INTERRUPT SIGNAL MASK

[75] Inventors: Scott A. Emery, San Jose; Brian Petersen, Los Altos; W. Paul Sherer, Sunnyvale, all of Calif.

[73] Assignee: 3COM Corporation, Santa Clara, Calif.

[21] Appl. No.: 12,561

[22] Filed: Feb. 2, 1993

[51] Int. Cl.$^6$ .................................................. G06F 9/46
[52] U.S. Cl. .................. 395/735; 395/740; 395/869; 364/941; 364/280.8
[58] Field of Search .................................. 395/275, 735, 395/69, 740, 8

[56] References Cited

U.S. PATENT DOCUMENTS

| | | | |
|---|---|---|---|
| 3,905,025 | 9/1975 | Davis et al. | 395/725 |
| 4,349,872 | 9/1982 | Fukasawa | 364/200 |
| 4,631,659 | 12/1986 | Hayn, II et al. | 364/200 |
| 4,768,149 | 8/1988 | Konopik et al. | 364/200 |
| 4,807,117 | 2/1989 | Itoku et al. | 395/725 |
| 4,847,752 | 7/1989 | Akashi | 364/200 |
| 4,961,161 | 10/1990 | Kojima | 364/736.5 |
| 4,987,535 | 1/1991 | Takayama | 364/200 |
| 5,146,595 | 9/1992 | Fujiyama et al. | 395/725 |
| 5,161,228 | 11/1992 | Yasui et al. | 395/725 |
| 5,179,704 | 1/1993 | Jibbe et al. | 395/725 |
| 5,193,195 | 3/1993 | Miyazaki | 395/725 |
| 5,283,904 | 2/1994 | Carson et al. | 395/725 |
| 5,319,752 | 6/1994 | Petersen et al. | 395/250 |
| 5,349,667 | 9/1994 | Kaneko | 395/725 |

OTHER PUBLICATIONS

Chiang, Al, "An EtherStar is Born", ESD:Magazine, Digital Design Publishing Company, Mar. 1988; 1900 West Park Drive, Westborough, MA 01581.
EtherStar Ethernet/Starlan Controller, Fujitsu MB86950, May, 1988.

*Primary Examiner*—Christopher B. Shin
*Attorney, Agent, or Firm*—Haynes & Davis

[57] ABSTRACT

Indication and interrupt signals generated by a network adapter representing asynchronous events are managed by a host system. The network adapter includes a first mask logic for selectively disabling the indication signals from being stored in a first memory location by the host writing to a first mask register. A second mask logic which is coupled to the first memory location also selectively disables the indication signals from being stored in a second memory location creating two levels of status information. The indication signals may also be disabled from being stored in the second memory location responsive to the host writing to a second mask register. The first memory location may be read from the host in order to determine whether a network event occurred during an interrupt service routine, while interrupt means generates an interrupt signal to the host responsive to the value in the second memory location. A third level of control is provided by an internal counter which allows for automatic enabling and/or disabling of a plurality of indications and interrupts with and without explicit commands in the host driver subroutines.

30 Claims, 18 Drawing Sheets

| base address | | size |
|---|---|---|
| 0x0 | Transmit Data Buffer | 3K |
| 0xc00 | Transmit Descriptors | 5K |
| 0x2000 | Reveice Buffer | 22K |
| 0x7800 | Transfer Descriptor | 1K |
| 0x7c00 | AdapterInfo Data | 256 |
| 0x7d00 | Network Statistics | 196 |
| 0x7e00 | Muticast Address Table | 96 |

Adapter RAM Memory Map

FIG.—7

| 31 | 16 | 15 | 0 | Offset |
|---|---|---|---|---|
| NextDescriptorPointer | | | | 0x0 |
| XmitFailure | | | | 0x4 |
| FrameLength | | | | 0x8 |
| XmitReqHandle | | XmitStatus | | 0xc |
| XmitProtId | | MACID | | 0x10 |
| XmitBufferCount | | XmitImmedLen | | 0x14 |
| Immediate Data | | | | 0x18 |
| XmitDataLen | | 0 | | ↑ repeated |
| XmitDataPtr | | | | XmitBufferCount times ↓ |

FIG.—8a

| 31 | 16 | 15 | 0 | Offset |
|---|---|---|---|---|
| reserved | | | | 0x0 |
| TDOffset | | TDBufferCount | | 0x4 |
| TDDataLen | | 0 | | 0x8 |
| TDDataPtr | | | | | repeated TDBufferCount times

FIG.—8b

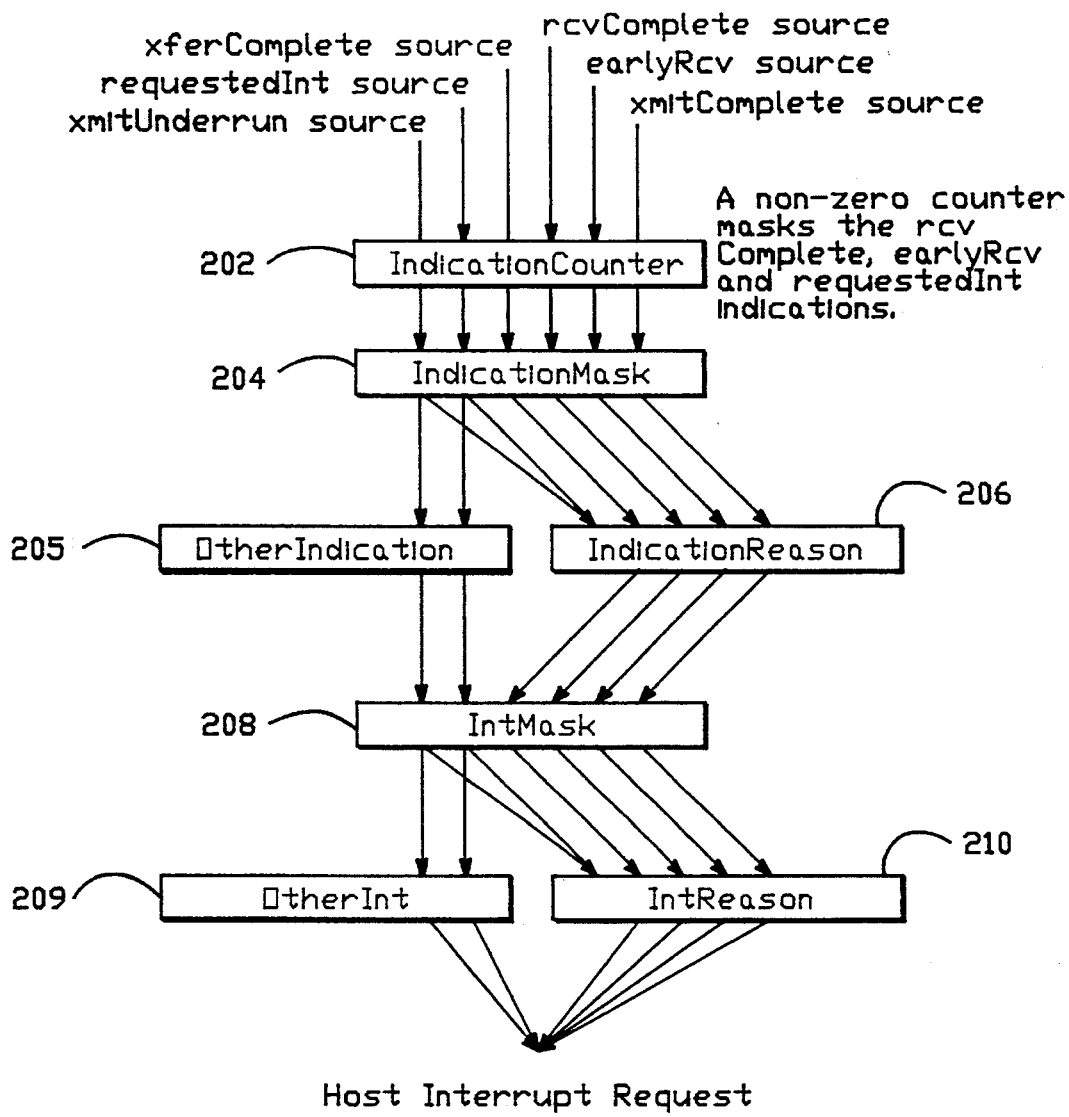
FIG.—12
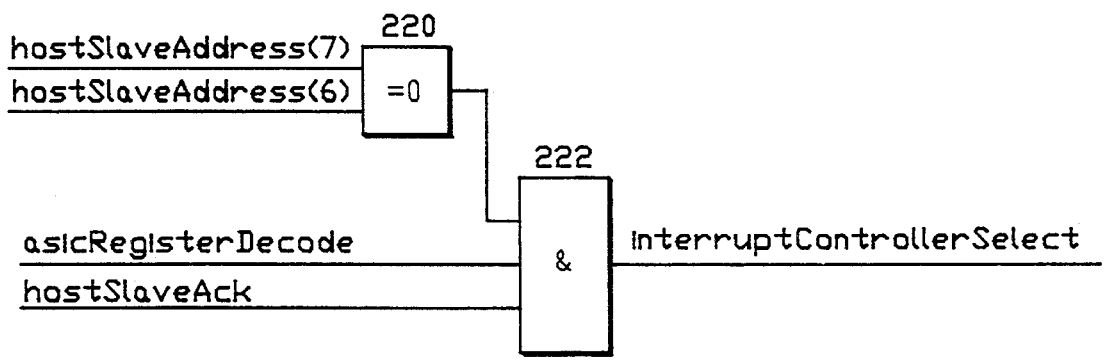
FIG.—13

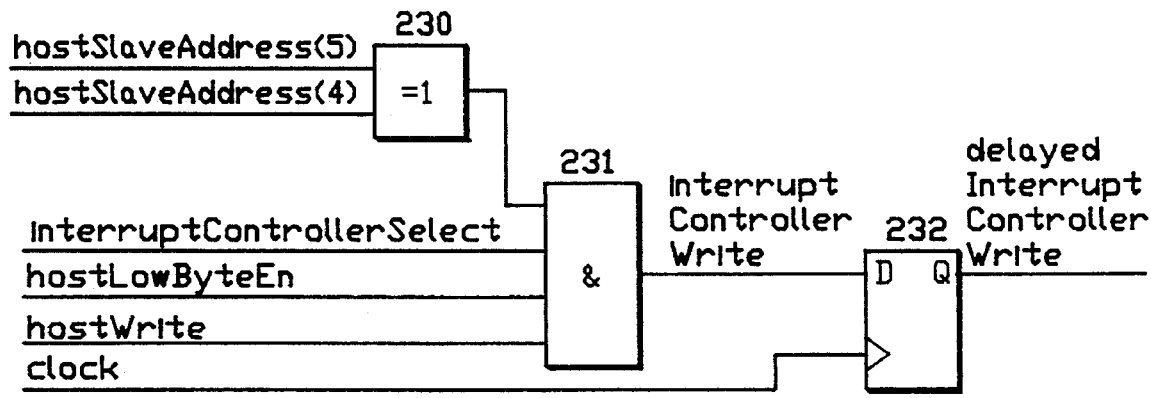
FIG.—14
| delayedHostSlaveAddress[4:2] | Selected Register |
|---|---|
| 000 | RcvIndicate |
| 001 | IntRequest |
| 010 | Undefined |
| 011 | Undefined |
| 100 | IndicationMask |
| 101 | IntMask |
| 110 | IndicationOff |
| 111 | IndicationOn |
FIG.—15

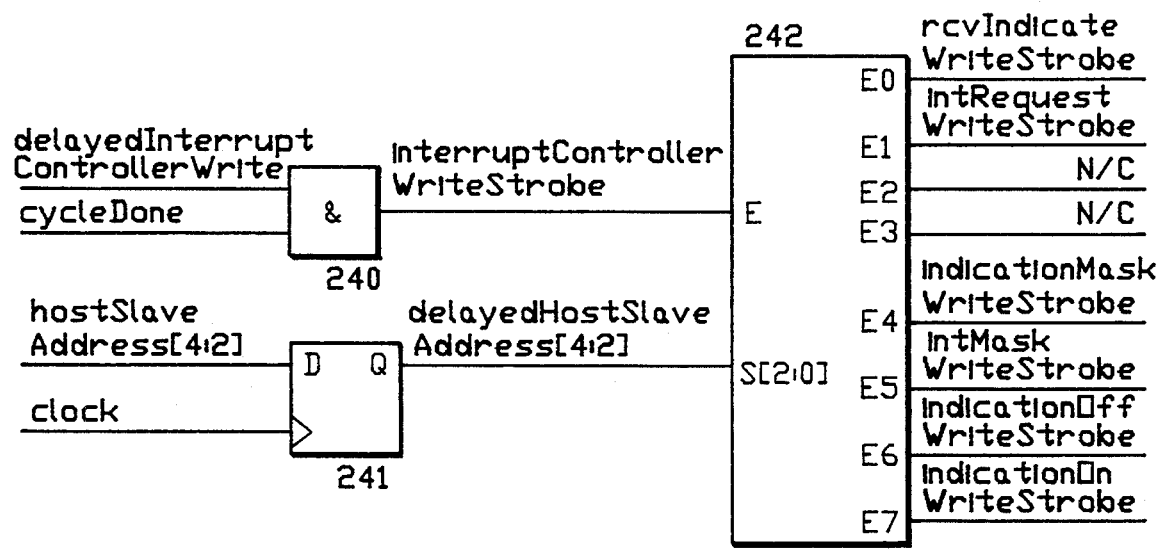
FIG.—16
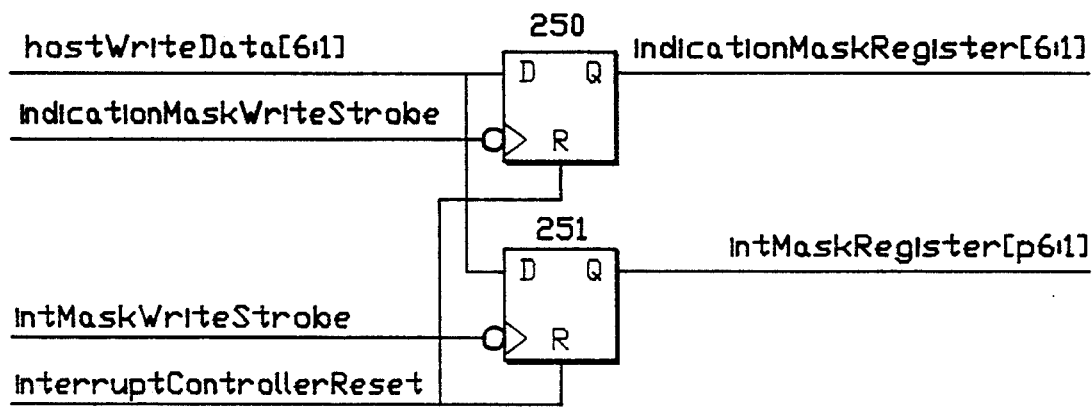
FIG.—17

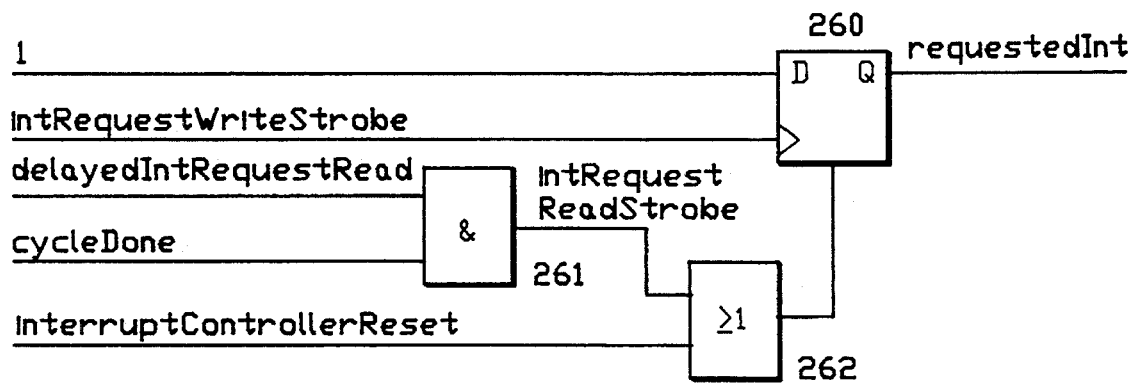
FIG.—18
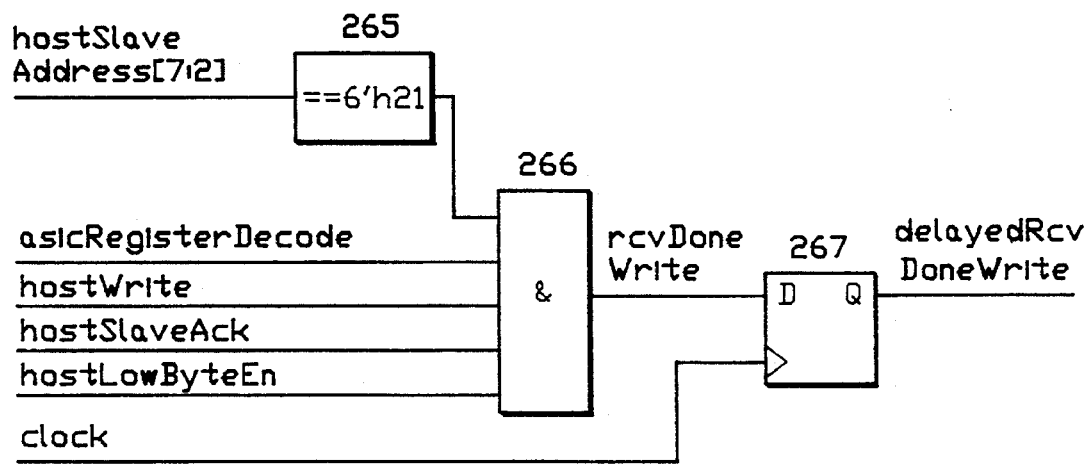
FIG.—19

FIG.—22

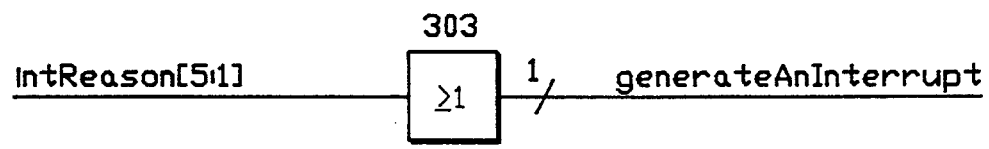
FIG.—24
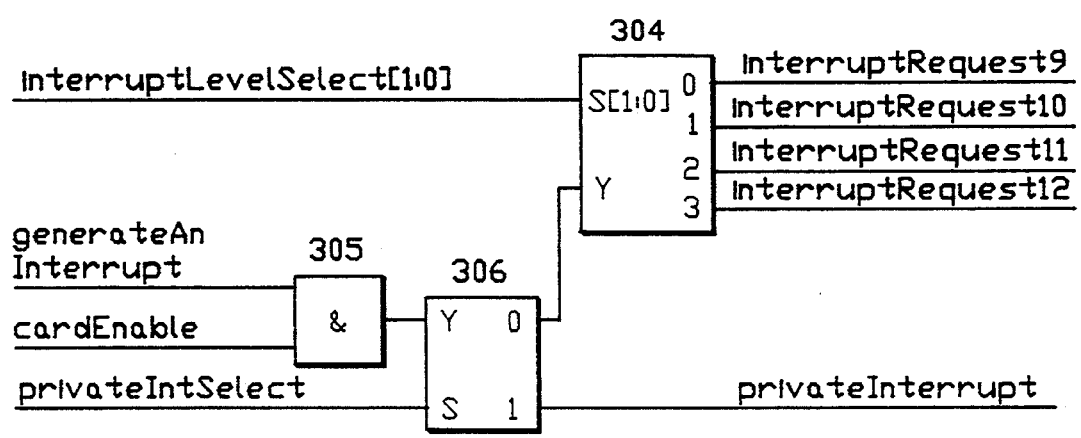
FIG.—25

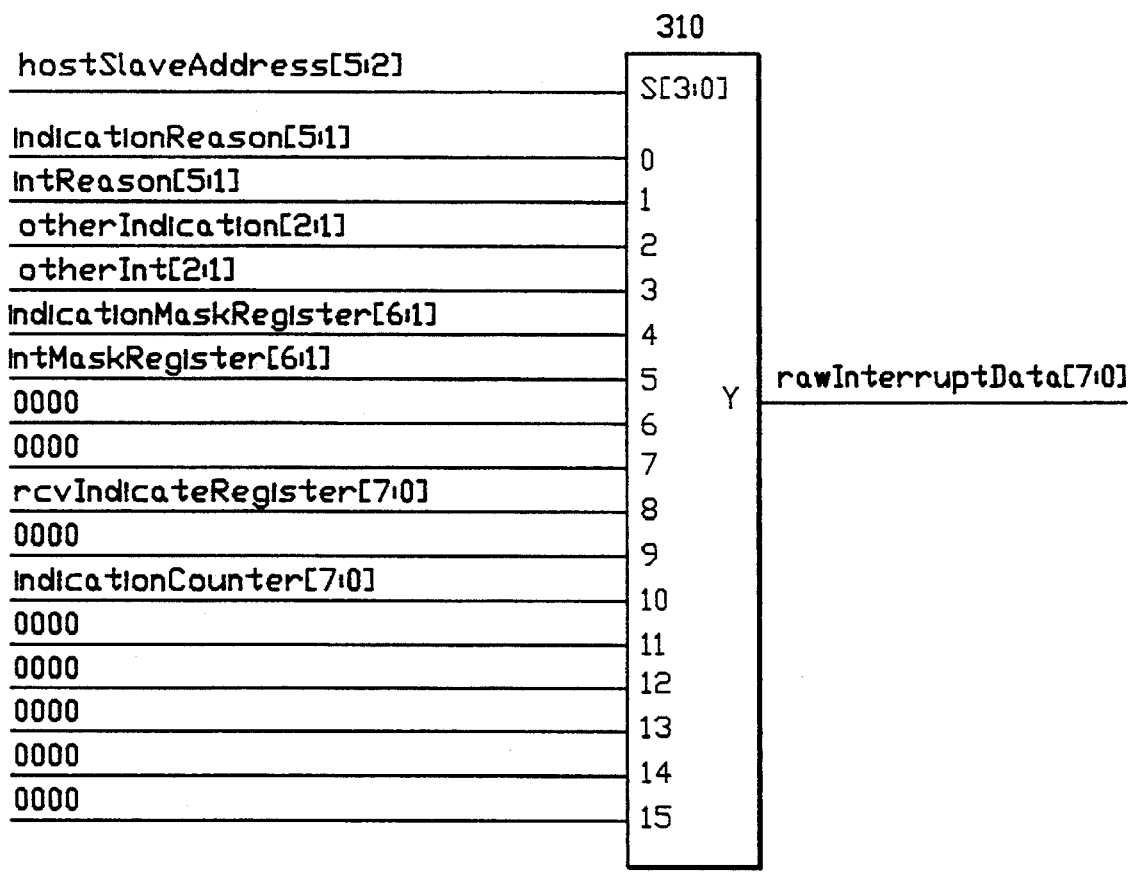
FIG.—26
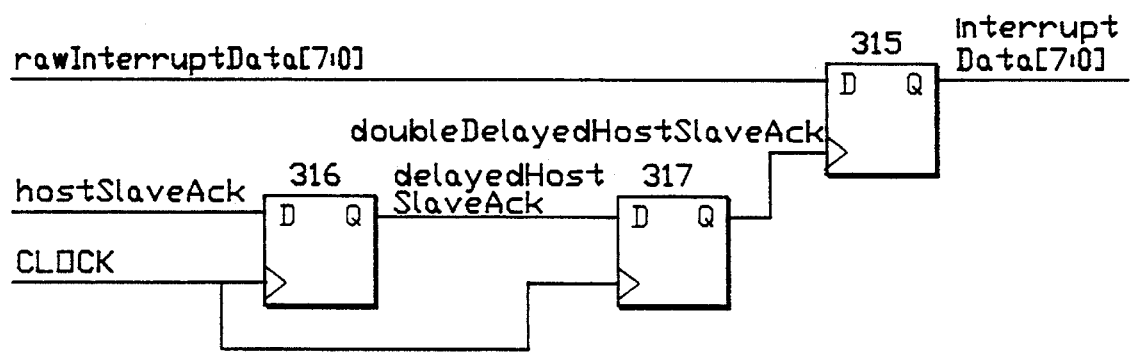
FIG.—27

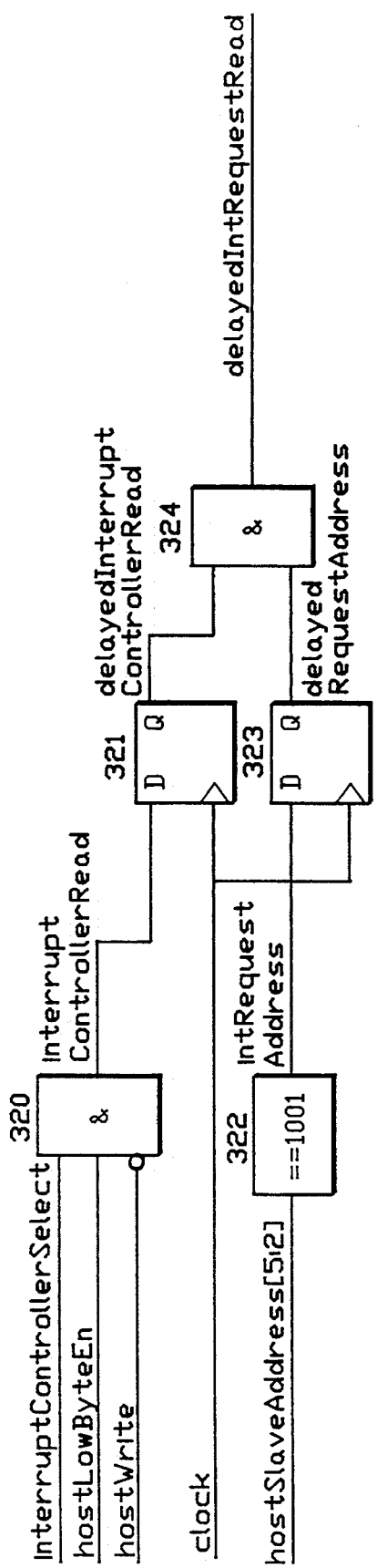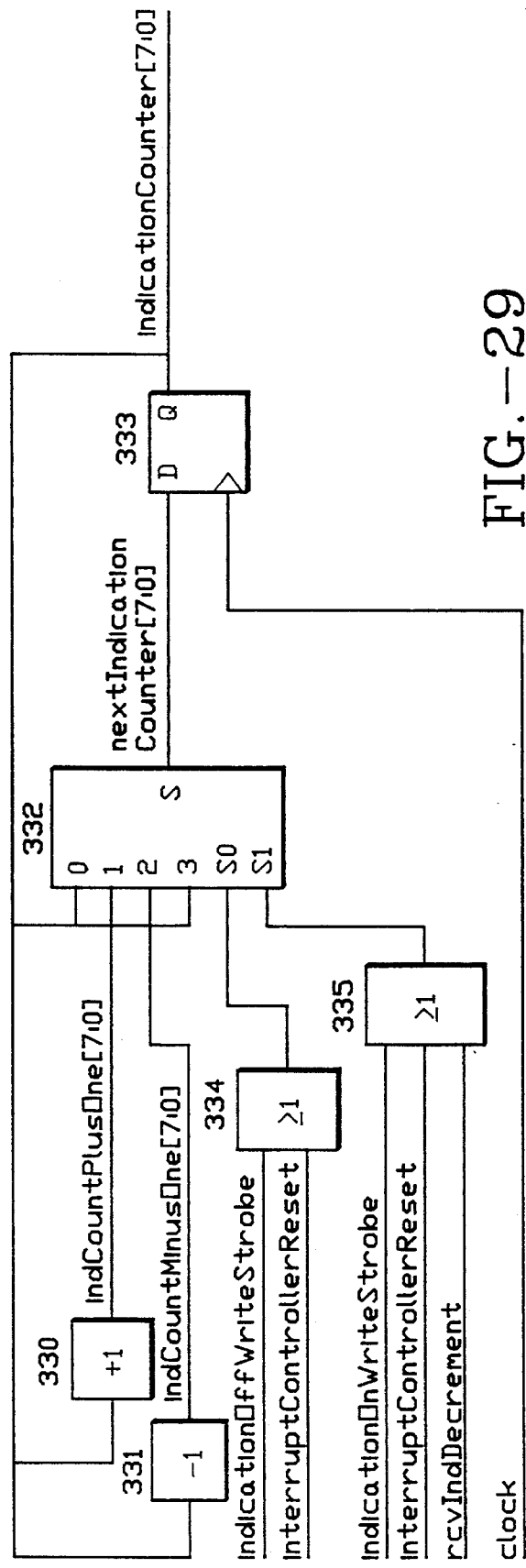

NETWORK ADAPTER WITH AN INDICATION SIGNAL MASK AND AN INTERRUPT SIGNAL MASK

CROSS-REFERENCE TO RELATED APPLICATIONS

The present application is related to co-pending U.S. patent application entitled NETWORK ADAPTER WITH HOST INDICATION OPTIMIZATION, Ser. No. 07/920,898, filed Jul. 28, 1992, which was owned at the time of invention and is currently owned by the same assignee.

BACKGROUND OF THE INVENTION

1. Field of the Invention

The present invention relates to architectures of network adapters, and particularly to managing indication and/or interrupt signals to a host system.

2. Description of Related Art

Network adapters involved in the transfer of data between a communications network and a host computer system typically must notify the host system of asynchronous events. In many circumstances, the host processor must take some action based on these asynchronous events. For example, if the network adapter has begun receiving a data frame, the host processor may want to know when a complete data frame has been received. Moreover, the host processor may require notification of the completion of the transfer of the data frame from the network adapter buffer memory to the host computer system.

Likewise, with respect to the transmission path, the host processor may also require notification of the completion of a download from the host system to the network adapter buffer memory as well as notification that a transmission from the network adapter buffer memory onto the communications network has been completed.

In related art systems, such as the National Semiconductor DP83932B, a systems-oriented network interface controller (SONIC) and the Intel 82586 local area network co-processor, an interrupt is generated by the network adapter to the host processor signaling an asynchronous event. The host processor then must determine the cause of the interrupt by examining the appropriate network adapter status registers and take the appropriate action in an interrupt service routine.

For example, if the host driver determines from the network adapter status register that a data frame has been received, the host driver calls a frame reception subroutine. However once the subroutine is called, most host driver frame reception subroutines can not be called again or re-entered. Therefore, interrupts which cause the host driver to call the frame reception subroutine must be disabled during at least the frame reception subroutine.

Prior art network adapters disable interrupts by using a mask register to mask interrupts; however, the masking of interrupts prevents the host from knowing that a second asynchronous event occurred during an interrupt service routine which was generated by a first asynchronous event. Even though an interrupt may not be desirable at a given time in an interrupt service routine, the host driver may still desire indication that the second event occurred in order to service the second event in only one interrupt service routine. For example, while interrupts should be disabled during a frame reception subroutine, the host driver would still be able to service a second frame which was received during the frame reception subroutine if the host driver was able to know that a second frame was received after exiting the frame reception subroutine but before exiting the interrupt service routine. Nevertheless, the present systems only offer one level of status information which generates interrupts. The single level of status information does not allow the host to know that other asynchronous events occurred during a single interrupt service routine causing additional interrupts to the host degrading host/network adapter performance.

In addition, a host subroutine may require interrupts to be disabled while calling another host subroutine which also requires interrupts to be disabled. For example, the host processor may be transferring data to the network adapter in a frame transferring subroutine which requires that interrupts be disabled when the network adapter must send a network adapter health status signal across the network. The host processor must call a health status subroutine within the frame transferring subroutine which also requires interrupts to be disabled. If the health status subroutine simply enables interrupts upon exiting the subroutine by an explicit software command, interrupts will be allowed to occur in the frame transferring subroutine. Therefore, additional host software is required which keeps track of the disabling and enabling of interrupts during various subroutines rather than allowing the network adapter to count the number of enabling and disabling commands.

Therefore, it is desirable to provide a network adapter with managed indication and interrupt signals which allows the host system to select which interrupts and which indication signals of asynchronous events will be generated to the host at a given time. Moreover, a network adapter which automatically disables and/or enables interrupts with and without explicit and additional host software commands in host subroutines is desirable.

SUMMARY OF THE INVENTION

The present invention provides an apparatus for managing indication and interrupt signals representing an event to a host. The apparatus comprises a first and second mask logic creating a hierarchy of status information to the host. The first mask logic disables an indication signal representing an event from being stored in a first memory location responsive to a write by the host to a first mask memory location. The second mask logic, coupled to the first memory location, disables the indication signal from being stored in a second memory location responsive to a write by the host to a second mask memory location. While both memory locations may be read by the host during an interrupt service routine creating a hierarchy of status information, only the values in the second memory location generate an interrupt signal.

According to another aspect of the present invention, a network adapter manages a plurality of indication signals representing asynchronous events to a host which has a host processor with host software subroutines. The network adapter includes counter mask logic for disabling a subset of the plurality of indication signals. The counter mask logic has a counter mask register selectively disabling the subset of indication signals responsive to the host processor writing to the counter mask register. Indication mask logic, coupled to the counter mask logic, selectively disables individual indication signals responsive to a write by the host processor to an indication register mask. An indication memory location is coupled to the indication mask logic which stores indication values representing asynchronous events. Interrupt mask logic is coupled to the indication memory location for selectively disabling indication values from being stored in an interrupt memory location responsive to a write by the host processor to an interrupt mask register which creates a second level of status information. The interrupt memory location is coupled to the interrupt mask logic for storing an interrupt value representing indications of asynchronous events with interrupt means generating an interrupt responsive to an interrupt value in the interrupt memory location.

Finally, according to another aspect of the present invention the counter mask logic includes a register containing a counter value and means for incrementing and decrementing the counter value in the register responsive to host software subroutines. Means for disabling or enabling a subset of the plurality of indications is responsive to the counter value in the register allowing for the host processor to disable or enable the subset of indication signals with and without explicit software commands.

Other aspects and advantages of the present invention can be seen by one skilled in the art upon review of the figures, the detailed description and the claims which follow.

BRIEF DESCRIPTION OF THE FIGURES

FIG. 7 is a memory map of the adapter memory independent of the host system address space.

FIGS. 8a–b illustrates the transmit and transfer descriptor data structures according to one aspect of the present invention.

FIG. 12 illustrates the relationship between indication signals, interrupt signals and their respective masks.

FIG. 13 is a schematic illustrating how the signal for accessing the interrupt controller 60 shown in FIG. 4 is generated.

FIG. 14 is a schematic illustrating how the signal for writing to the interrupt controller is generated.

FIG. 15 shows a table of the codes used for selecting an interrupt controller register.

FIG. 16 is a schematic illustrating how the interrupt controller register write strobes are generated.

FIG. 17 is a schematic of the indication mask and interrupt mask registers.

FIG. 18 is a schematic illustrating how the signal for identifying when an interrupt has been requested is generated.

FIG. 19 is a schematic illustrating how the signal for identifying a write to RCV DONE register is generated.

FIG. 24 is a schematic illustrating when an interrupt signal should be generated.

FIG. 25 is a schematic illustrating the generation of interrupt level signals.

FIG. 26 is a schematic illustrating how the interrupt controller registers are read.

FIG. 27 is a schematic illustrating how reading from the interrupt controller is delayed.

FIG. 28 is a schematic illustrating the generation of the signal for identifying when the INTERRUPT REQUEST register is read.

FIG. 29 is a schematic illustrating an indication counter according to the present invention.

DESCRIPTION OF THE PREFERRED EMBODIMENTS

A detailed description of the preferred embodiments of the present invention is provided with respect to the figures. FIGS. 1 through 4 describe a representative system implemented according to the present invention. FIGS. 5 through 11 illustrate the data organization and data flow in a preferred embodiment of the present invention. FIGS. 12 through 29 describe the interrupt and indication logic used for managing indications and interrupts to the host.

Figure 1:
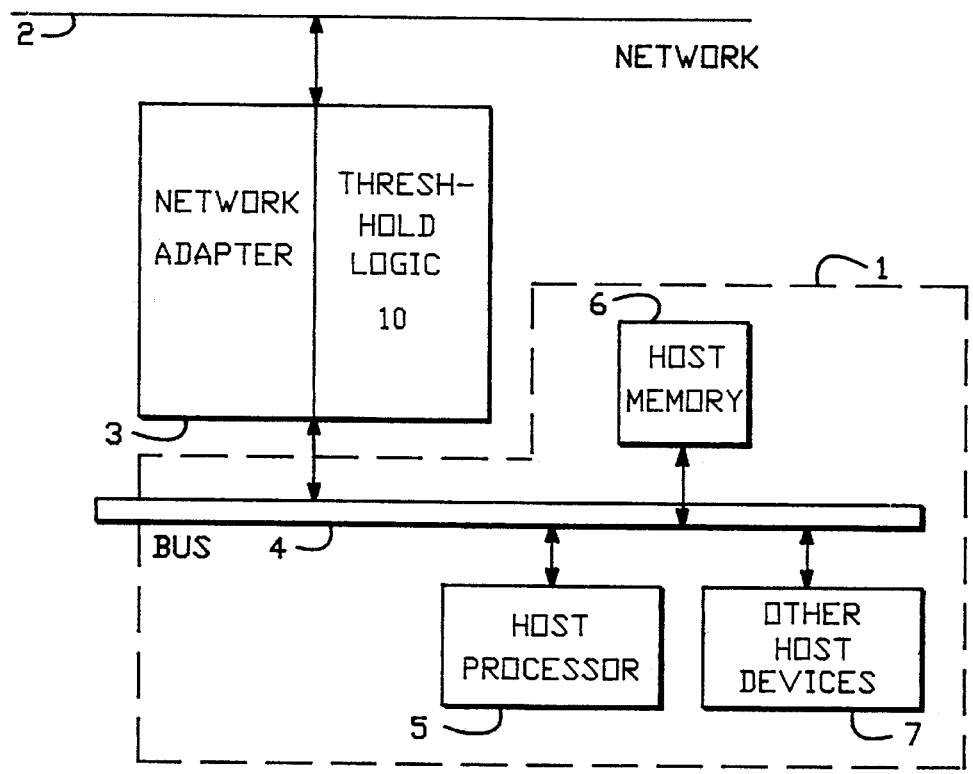
FIG. 1 is a network adapter configuration according to the present invention.

FIG. 1 is a network adapter configuration according to the present invention. Network adapter 3 with interrupt and indication logic 10 is coupled to network 2 and a host system 1. Network adapter 3 is responsible for transferring data frames between network 2 and host system 1. In the preferred embodiment, network 2 is an ETHERNET network. The host system includes a host bus 4, such as an EISA bus. The host system bus 4 includes address lines which define a host system address space. Typically, for an EISA bus, there are 32 address lines establishing a host system address space of about 4 gigabytes. The host system further includes host memory 6, host processor 5, and other host devices 7 coupled to host bus 4. Typically, devices on host bus 4, such as network adapter 3, request service from host processor 5 by generating an interrupt on host bus 4. The host processor 5 then must save its system parameters and determine which device caused the interrupt and what service is required. During host processor 5's interrupt service routine, host processor 5 examines status registers in network adapter 3 to determine what caused the interrupt and if other transfer events occurred. Host processor 5 then takes the appropriate action based on network adapter 3 status registers.

Interrupt and indication logic 10 in network adapter 3 is designed for allowing the host system to alter when an interrupt is generated and what data transfer events will be indicated to the host processor. The interrupt and indication logic includes three masks which may be altered by the host. The first mask or indication counter mask selectively disables a subset of the indication signals generated by the network adapter indicating network adapter asynchronous events. The second mask selectively disables individual indication signals, and the third mask selectively disables the generation of interrupt signals.

Figure 2:
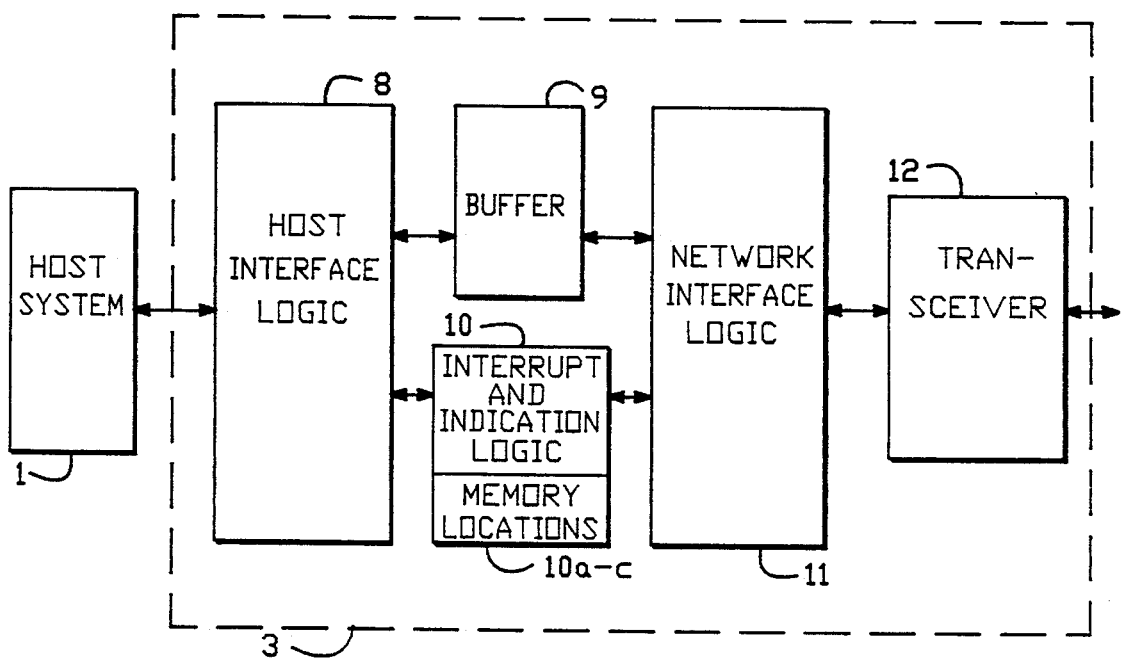
FIG. 2 is a functional block diagram of the network adapter with interrupt and indication logic for managing indication and interrupt signals according to the present invention.

FIG. 2 is a functional block diagram of network adapter 3 with interrupt and indication logic 10 illustrating the various transfer paths. Network adapter 3 contains transceiver 12 which transmits and receives data frames across network 2. Network interface logic 11 is responsible for the transfer of a data frame between network buffer 9 and transceiver 12. Likewise, the network adapter 3 contains host interface logic 8 which is responsible for transferring a data frame between network buffer 9 and host system 1. Interrupt and indication logic 10 includes mask memory locations 10a–c which contain the mask values used to selectively disable indications and interrupts. Mask memory locations 10a–c may be read by the host system to determine the configuration of the masks. The mask memory locations 10a–c may also be written to by the host altering the mask configurations. Although explicit software commands by the host processor may reconfigure mask memory location 10a, the internal counter mask, indication and interrupt logic 10 also provides for automatic reconfiguration of the internal counter mask without explicit host processor writes to the internal counter mask. The altering of the mask values in turn selectively disables or enables indications and interrupts to the host system.

In addition to mask memory locations 10a–c, indication and interrupt logic 10 includes four memory locations (not shown) for storing indication and interrupt values which have not been selectively disabled by the masks. The four memory locations may be read by the host processor in order to determine the occurrence of network adapter events. The first and second memory locations contain values representing indications of network adapter events; while, the third and fourth memory locations contain interrupt values representing network adapter events and also causes interrupts to be generated.

I. System Overview

Figure 3:
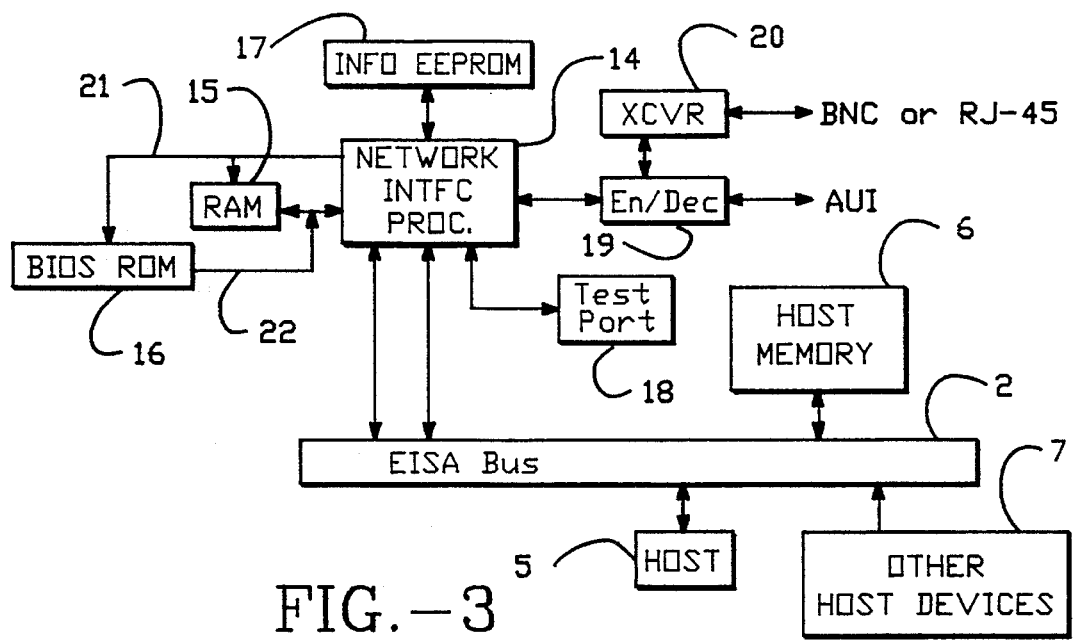
FIG. 3 is a block diagram of the network interface adapter according to the present invention.

FIG. 3 is a schematic diagram of host system 1 with the network interface adapter of the present invention. The network interface controller includes a network interface processor 14, implemented in one preferred system as an application specific integrated circuit designed to implement the functions outlined below using VERILOG design tools as known in the art. The VERILOG design tools are available from Cadence, Inc., San Jose, Calif. The network interface processor 14 is coupled through appropriate buffers to the bus 2. The network interface processor 14 is also coupled to random access memory 15, BIOS ROM 16, and INFO EEPROM 17, a test port 18, an encode/decode chip 19, and a network transceiver 20. The network transceiver 20 is, in turn, coupled to a network medium.

A majority of the functionality is embodied in the network interface processor 14. In the preferred embodiment, all registers that are accessible across the bus 2 by the host system reside either in the processor 14, or in the RAM 15. If resident in the RAM 15, their access is managed by the network interface processor 14.

The RAM 15 is a primary resource on the network interface controller. This resource provides buffer memory outside the host address space used in the transmit and receive operations of the network interface. Details concerning the organization and utilization of this RAM 15 are described below.

The BIOS ROM 16 provides extension to the host system's basic input/output code through the network interface processor 14 during initialization. The addresses for the BIOS ROM 16 and the data from the BIOS ROM 16 are coupled to the network interface processor 14 across buses 21 and 22, respectively, which are also shared by the RAM 15.

The INFO EEPROM 17 stores critical adapter specific data used by drivers, diagnostics, and network management software. This data is stored during the manufacturing process. During initialization of the interface controller, the contents of the EEPROM 17 are loaded into a prespecified area of the RAM 15 for use during operation.

Coupled to the interface processor 16 is an encode/decode chip 19, such as the National Semiconductor 8391 Manchester encode/decode chip. The signals coupled to the AUI connector are provided to allow use of transceivers external to the board.

The transceiver 20 in a preferred system comprises either a thin Ethernet (coax/BNC) transceiver or a 10BaseT (Type 3/RJ-45) transceiver. Control signals for the transceiver 20 are produced on the network interface controller 14, using the conversion logic on the encoder/decoder chip 14.

A test port 18 is provided in a preferred system for use during manufacture and testing.

II. Controller Functional Units

Figure 4:
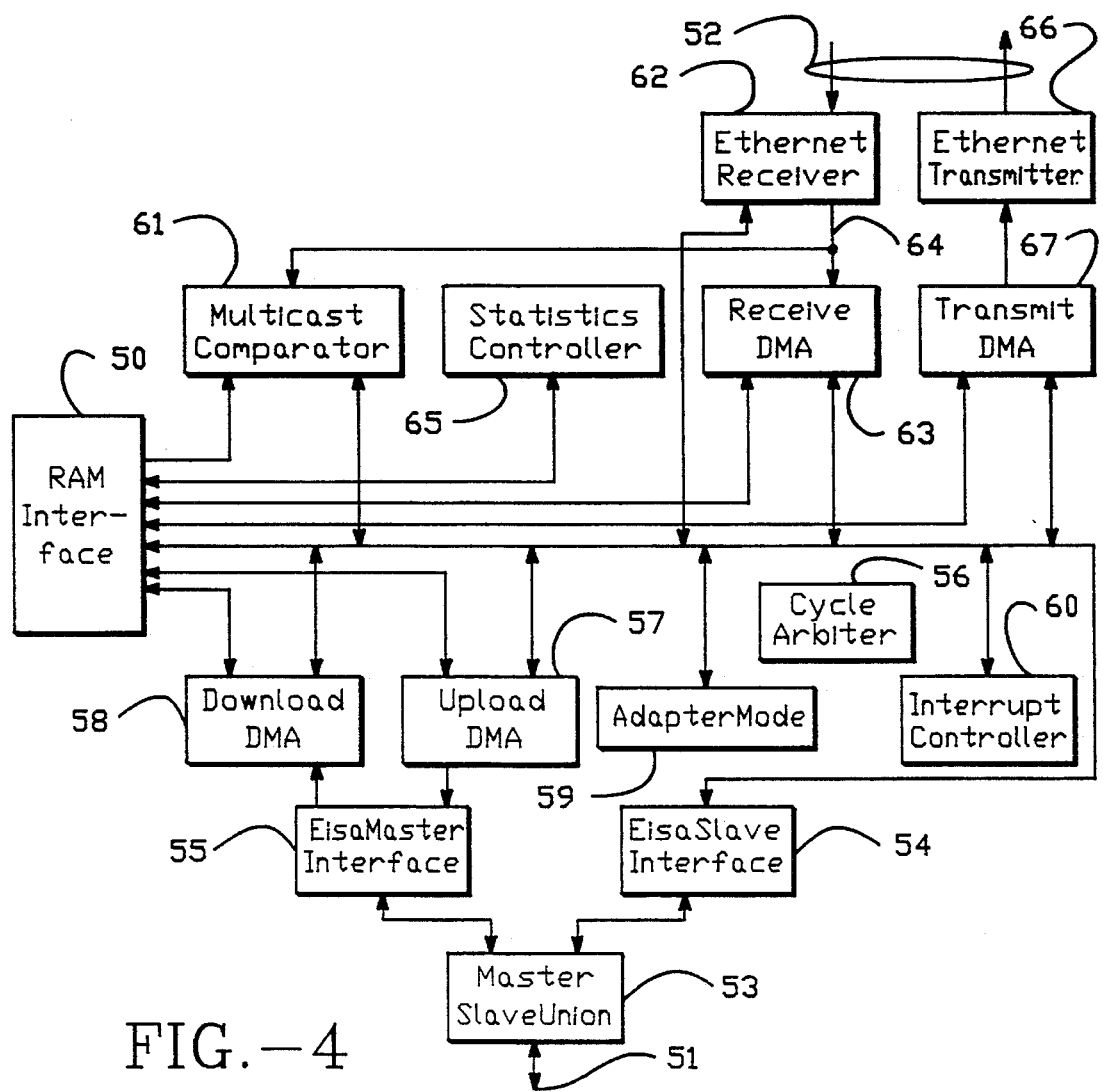
FIG. 4 is a functional block diagram of the interface controller chip shown in FIG. 3.

FIG. 4 provides a block diagram of the network interface processor 14 of FIG. 3, including functional blocks and data paths. There are numerous connections not shown having to do with the control of the various data flow paths. The interfaces illustrated include a RAM interface 50, a host bus interface 51, and a transceiver interface 52. The bus interface 51 is implemented for an EISA bus, and operates at times either as a master or as a slave on the bus. Each of the functional units in the implementation shown in FIG. 4 is described below.

A. EISA Slave Interface 54

The EISA slave interface 54 provides a path for the EISA host bus to access the registers and buffers managed by the network interface controller. The module contains configuration registers for the controller, and performs crude decoding of the EISA bus for the purpose of routing signals. The EISA slave interface 54 does not interpret any of the addressing of individual registers distributed throughout the controller.

In operation, the EISA slave interface continuously monitors the EISA address bus and determines when the configuration registers, memory mapped network registers, or BIOS ROM of the adapter are being accessed.

In addition, for every memory slave cycle initiated by the EISA bus, the EISA slave interface will post a cycle request to the cycle arbiter 56. The cycle arbiter imposes wait states upon the host system until the request has been granted.

The EISA slave interface also provides a generic 32 bit bus interface to the remainder of the network controller. The generic nature of the interface allows for easy adaptation of the design to other bus types, such as the microchannel, without requiring redesign of the remainder of the chip.

Bits 14-2 of the EISA address bus are latched and pass through to other modules. The least significant two bits of the address are represented by 4 byte enables that are also valid throughout a data transfer cycle. Four 8-bit byte lanes make up the slave data channel. The data bus is actually a pair of unidirectional buses, one for writes and one for reads in a preferred system. The data write bus is wired in a multi-drop fashion to all modules that require connection to the EISA data bus through the slave interface. The read bus is multiplexed and masked in the RAM interface module 50. Write requests by the EISA bus can be held until they are acknowledged by the cycle arbiter 56. When a cycle is held, the EISA bus may be released from wait states while the cycle completes on the adapter. If a second cycle is generated by the EISA bus while the first one is still pending, then the EISA bus will be held off with wait states until the pending write is performed. In this specific embodiment, pipelining of EISA reads is not supported.

The EISA slave interface also provides an interface to the EEPROM 17. This interface operates to transfer the contents of the EEPROM 17 into the adapter memory after reset.

There are numerous registers in the EISA slave interface module 54, primarily related to configuration of the adapter that conform to the EISA bus specification. These registers do such things as set up the adapter's memory base address, the interrupt level, the transceiver type selection, and the BIOS ROM enable. The configuration registers also provide the host with a positive means of identifying the adapter type and to globally disable the adapter.

B. EISA Master Interface 55

The EISA master interface 55 handles requests from the upload DMA 57 and download DMA 58 for performing bus master operations across the EISA bus. The EISA master interface 55 autonomously arbitrates between pending upload and download requests, because of the EISA bus disallowing mixed reads and writes while performing burst transfers, used by the DMA operations of the preferred embodiment.

The bus master transfers are always initiated by either the upload DMA 57 or the download DMA 58. The transfers may be terminated by either the DMA modules upon completion of a transfer, or by the EISA master interface upon preemption by another arbitrary device on the EISA bus.

Thus, the function of the EISA master interface 55 is to arbitrate for access to the EISA bus when transfer requests are pending from either or both of the upload DMA 57 and the download DMA 58. The EISA master interface 55 performs the signalling necessary to establish first transfers with address slaves on the bus. It also ensures compliance with the EISA bus definitions.

This module also converts real mode segment:offset addresses to 20 bit linear addresses when enabled by the adapter mode logic 59.

C. Master/Slave Union Module 53

The master/slave union module 53 provides for sharing of connections to the EISA bus by the EISA master interface 55 and the EISA slave interface 54. This union module 53 consists primarily of a series of 2:1 multiplexers.

D. Interrupt Controller Module 60

The controller also includes an interrupt controller module 60. The interrupt controller module 60 implements various interrupt and indication functions, including masking and enable/disable mechanisms. Interrupt signals are generated by various modules within the controller, and are routed to the interrupt controller module 60. The interrupt controller module 60 then passes the interrupt signals through various enables and masks before ORing them together and driving the result onto the host bus.

The interrupt controller module 60 does not detect interrupt worthy events or acknowledge the interrupts passed to the host. It includes a number of ASIC-resident registers utilized in the interrupt handling functions.

E. Adaptor Mode Module 59

The adapter mode module 59 provides a number of functions including setting various basic operating modes of the controller, and reporting status of various conditions of the controller. The adapter module 59 also establishes the base address of a window register used for diagnostics by the host system. Furthermore, the adapter mode module 59 generates reset functions for the adapter. Also, this module provides the MAC ID register which identifies the media access controller implemented by the device, for communication to various modules within the controller and to the host system.

F. Cycle Arbiter Module 56

The cycle arbiter module 56 is responsible for distributing access to the adapter's RAM resident and ASIC-resident registers through the RAM interface 50 among various requestors. It functions to allow timely access to the RAM by modules that are most in danger of suffering an overrun or underrun condition in response to a priority scheme.

G. Multicast Comparator Module 61

The controller illustrated in FIG. 4 also includes a multicast comparator module 61. When enabled by the adapter mode module 59, the multicast comparator module 61 performs a bit by bit comparison of a received frame's destination address field with contents of the multicast address table. The multicast address table is established in the host and stored in RAM 15. A mismatch during this compare, coupled with neither an individual address nor a broadcast address match, will result in the rejection of an incoming frame.

Thus, the multicast comparator module 61 monitors the activity of the Ethernet receiver module 62 and the receive DMA module 63 to determine when a new frame is being received. Each byte that is received by the Ethernet receiver 62 and presented at the parallel interface 64 of the receiver, is shadowed by the multicast comparator module 61. These bytes are then compared against valid entries in a multicast address table accessible by the multicast comparator 61.

The multicast comparator 61 does not establish or maintain the contents of the multicast address table. However, the module detects the host accesses to the table and supplies appropriate redirection offsets to the RAM interface module 50.

H. Statistics Controller Module 65

The preferred system also includes a statistics controller module 65. This module monitors activity of various other modules within the controller, most particularly the Ethernet transmitter module 66 and the Ethernet receiver module 62, and updates statistics maintained in RAM 15 as applicable events occur.

I. Download DMA Module 58

The download DMA module 58 is responsible for issuing requests for bus master downloads of data from the host system to the adapter memory. This data is then deposited within the adapter's onboard transmit data buffer for either immediate or future transmission.

As soon as buffer descriptors are defined and one of the transmit data buffers becomes available, as described below, the download DMA module submits requests for download bus master operations to the EISA master interface 55. The download DMA module 58 performs byte alignment, including any required packing and unpacking to align the data as implied by the respective starting addresses of the host and the adapter.

The download DMA module 58 also includes logic for maintaining the transmit descriptor ring buffer within the adapter's RAM. The download DMA module 58 generates an interrupt in the appropriate mode to indicate completion of the download operation. Also, the download DMA module 58 informs the transmit DMA module 67 when it is time to begin transmission. Various registers involved in the download DMA operation are described in more detail below as they are involved directly in the data buffering process of the present invention.

J. Transmit DMA Module 67

The transmit DMA module 67 operates to fetch bytes from the transmit descriptor buffer, the transmit data buffer, or both, as described below, when directed to do so by the download DMA logic 58. The fetched bytes are then presented in sequence to the Ethernet transmitter module 66.

Thus, the transmit DMA module 67 functions to read the contents of the transmit descriptor ring buffer to determine the extent of immediate data, and the length of the overall frame to be transmitted. If a frame specified does not match the specifications for the network, for instance, is shorter than the 802.3 minimum, and the adapter is so enabled, this module will supply additional bytes of undefined data to the Ethernet transmitter module 66 as padding.

Collision retries in the CSMA/CD network are handled by the transmit DMA module 67. When a collision is indicated by the Ethernet transmitter 66, the transmit DMA module 67 will resubmit the same frame by reinterpreting the frame descriptor in the buffer.

If enabled, and when the transmit complete condition is satisfied, a transmit complete interrupt is generated for handling by the interrupt controller 60 in the transmit DMA module 67.

The transmit DMA module 67 also stores appropriate frame status in the transmit descriptor ring buffer of the adapter upon completion of transmission.

The transmit DMA module 67 also detects underrun conditions, when a shortfall of data available for transmission occurs.

Again, registers involved in operation of the transmit DMA module 67 are described in detail below.

K. Ethernet Transmitter Module 66

The Ethernet transmitter module 66 is an essential implementation for an 802.3 standard network. This module accepts parallel data bytes from the transmit DMA module 67 and applies the 802.3 access rules, and supplies serial data to the external encoder/decoder chip.

L. Ethernet Receiver Module 62

Similarly, the Ethernet receiver module 62 is an essential 802.3 implementation. This module accepts serial data from an external encoder/decoder, applies the 802.3 rules to the data and presents the data in parallel form for use by the receive DMA module 63. Thus, the Ethernet transmitter 66 and Ethernet receivers perform the standard CSMA/CD functions.

M. Receive DMA Module 63

The receive DMA module 63 is a complement function to the transmit DMA module 67. This module is responsible for accepting parallel data bytes on the Ethernet receiver 62 and depositing them in the adapter's receive ring buffer.

The receive DMA module 63 is responsible for assembling bytes from the Ethernet receiver into 32 bit words prior to storage in the adapter's RAM. At completion of frame reception, the frame's status and length are deposited within the receive ring buffer for use by the host system.

The receive DMA module 63 is also responsible for establishing and maintaining of the receive buffer ring within the RAM of the adapter as described in detail below. Furthermore, the positioning of the "LOOKBUF" register allowing the host to view received data, as described below, is handled by the receive DMA module 63.

The receive DMA module 63 also handles interrupt indications under appropriate conditions.

N. Upload DMA Module 57

The upload DMA module 57 performs data transfers from the receive buffer through the RAM interface 50 to the host system. Thus, the receive ring buffer is managed by the receive DMA module 63 and interpreted by the upload DMA 57. Actual bus master transfers are carried out by the EISA master interface module 55.

The upload DMA module 67 interprets data structures deposited in the receive ring buffer by the receive DMA module 63 including the location and length of a received frame. It also reads the transfer descriptor which is defined by the host system to determine how many bytes of the frame to transfer, and where in the host memory to transfer the frame.

The upload DMA module 57 requests bus master cycles from the EISA master interface module 55 in response to valid transfer requests deposited by the host.

The upload DMA module 57 also utilizes an interlock between the receive DMA module 63 and the upload DMA module 57, to reduce the transfer rate to the host system to prevent "getting ahead" of the frame being received through the receive DMA module 63. Finally, this module generates interrupts indicating completion of a transfer for use by the host. Various registers involved in this procedure are described below.

O. RAM Interface Module 50

The RAM interface module 50 provides multiplexers and masks for various functions involved in addressing the RAM. The module multiplexes the various address and data sources together to form parameters for RAM access cycles. This module 50 is responsible for gathering up data from the various other modules on the controller that can be read by the host system. Additionally, this module applies a mask to the data to force unused upper bits to a zero, and latches data words for multicycle reads.

P. JTAG Module

Also included in the controller, though not shown, is a JTAG module which implements a state machine as specified in IEEE standard 1149.1- 1990, May 21, 1990. This module provides a scan test of the ASIC's pins for use during manufacture.

III. Transmit and Receive Data Flow and Structure

Figure 5:
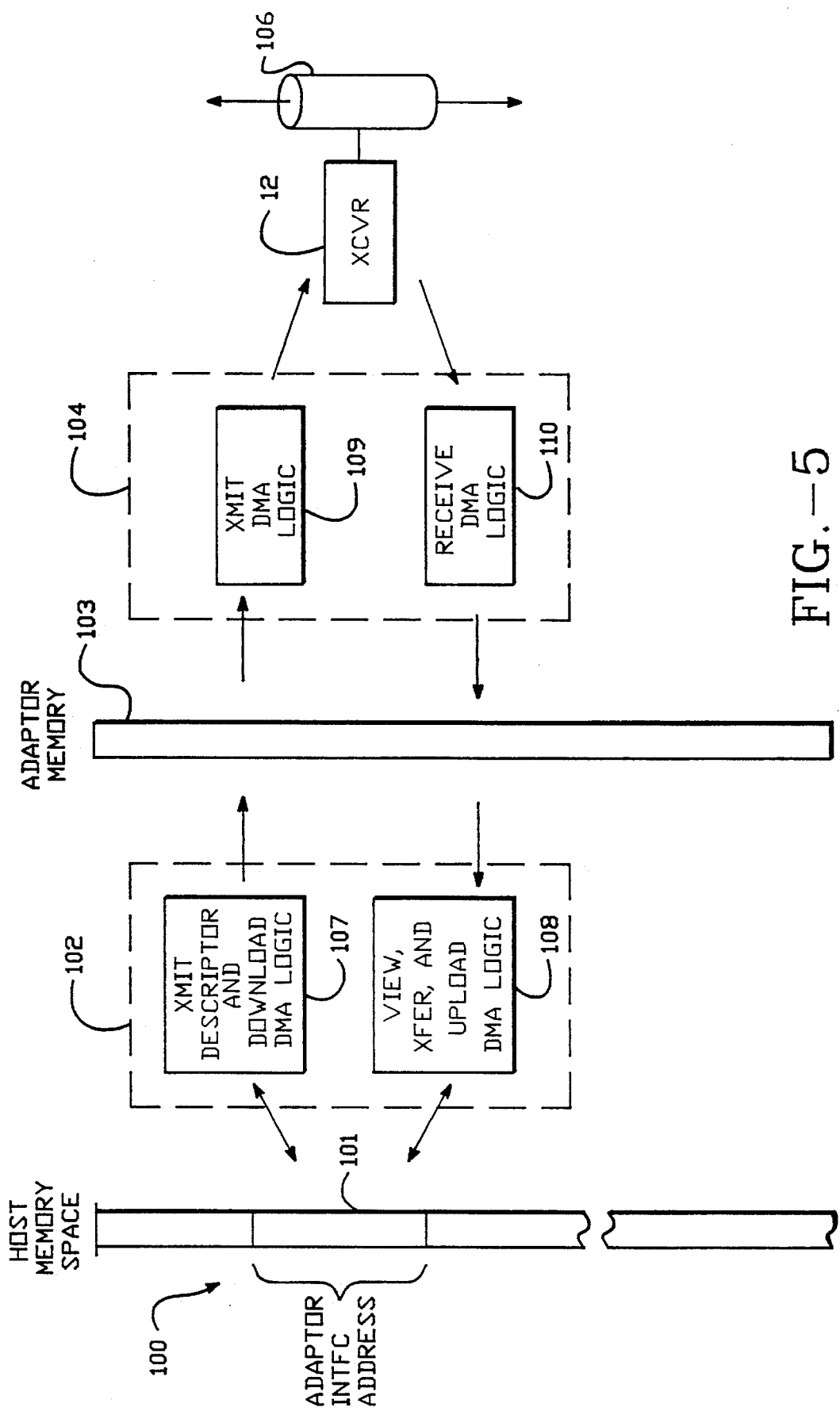
FIG. 5 is a schematic diagram illustrating data flow from the host memory space through adapter memory to the network according to the present invention.

FIG. 5 provides a heuristic data flow diagram of an adapter according to the present invention emphasizing the host interface, the adapter memory and the network interface data flow for transmission and reception.

As mentioned above, the host system will include a host memory space (generally 100) defined by the addresses on the host bus. A pre-specified block 101 of the host memory space is set aside for the adapter interface addresses. The adapter includes host interface logic 102 which is responsive to accesses across the host bus within the adapter interface address block 101. Also in the adapter is a host independent memory 103. The host interface logic 102 operates to transfer data between the specified block 101 of addresses and the independent memory 103. The adapter also includes network interface logic 104 which is coupled to the adapter memory 103. The network interface logic 104 manages transfers of data from buffers in the independent memory 103 and the network transceiver 12. The network transceiver 12 then supplies the data onto the network medium 106.

The host interface logic includes a transmit descriptor logic and a download DMA logic (generally 107) used in the transmit process, and view logic, transfer descriptor logic, and upload DMA logic (generally 108) used in the receive process. These modules basically manage communication of data between the independent memory 103 and the host in response to writes by the host system to the adapter interface address block 101. This relieves the host of any address translations or buffer management functions for the transmit and receive operations.

The network interface logic 104 includes transmit DMA logic, (generally 109) and receive DMA logic (generally 110). The transmit DMA logic 109 is responsive to descriptors stored in the adaptor memory 103, as described below, for moving data out of the independent adapter memory 103 to the network transceiver 12. Similarly, the receive DMA logic 110 is responsible for moving data from the transceiver 12 into the independent adapter memory 103. Thus, all communications of data from the network medium 106 are coupled directly into host independent memory 103. Communications from the host independent memory 103 are then controlled through the host interface logic 102 in response to a memory mapped region in the host memory space, greatly simplifying the protocol software necessary to communicate with the network.

Figure 6:
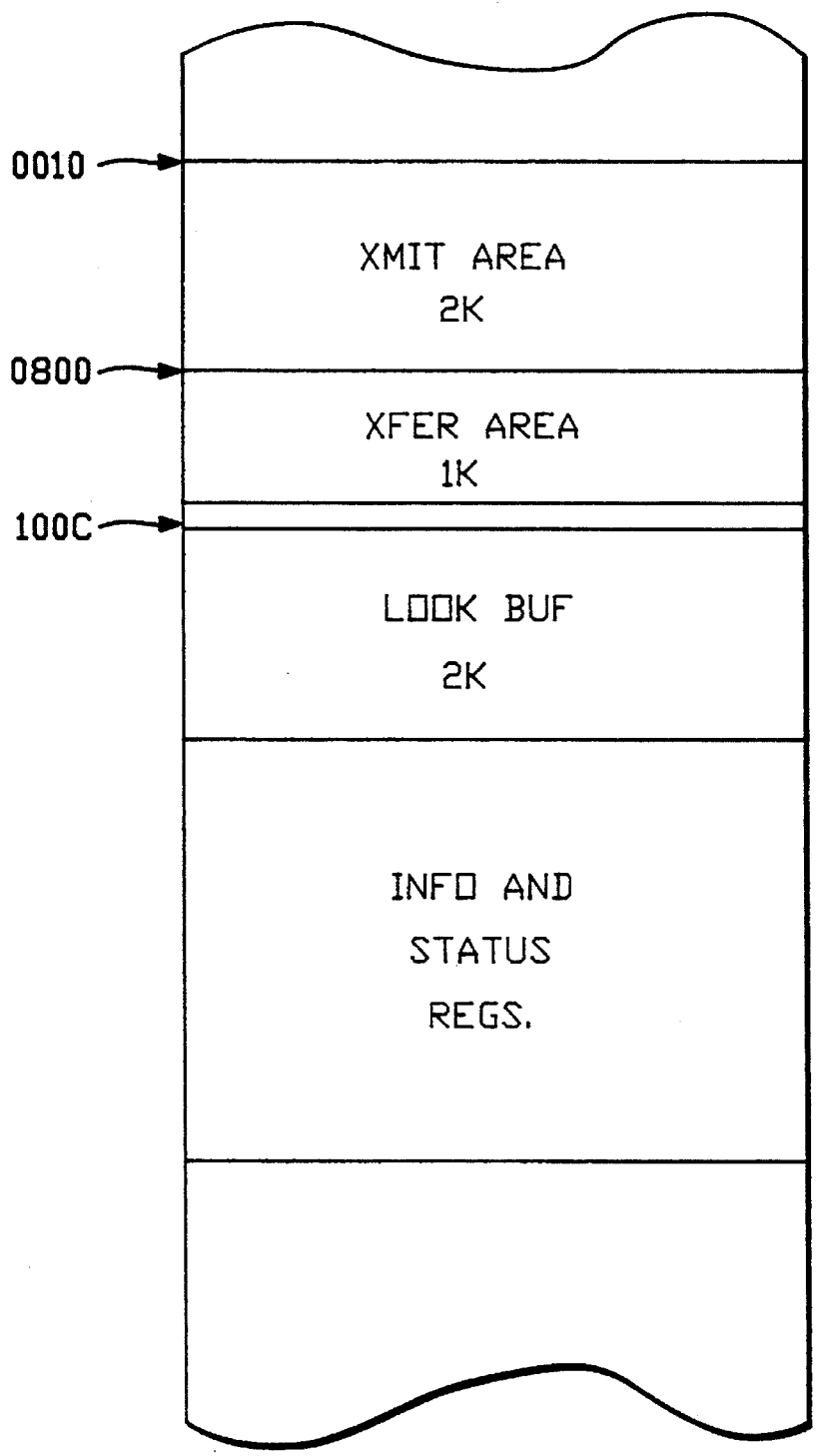
FIG. 6 is a map of the host system address space used for any transmission of data according to the present invention.

FIG. 6 provides a simplified map of the adapter interface host address block 101. The addresses within this block appear to the host like memory mapped registers in a continuous 8 K block of the host address space in a preferred system.

For the EISA embodiment, "registers", or mapped areas, in the block 101 are located on double word address boundaries, thus, addresses are a multiple of four. Many of the "registers" occupy several double words (as many as 509) of memory space.

Although the "registers" are memory mapped to an arbitrary prespecified block of host address space, none of the reads or writes performed by the host system to these registers actually directly access the adapter memory. Rather, the accesses to the memory mapped space are interpreted by the host interface logic 104 transparent to the host system. Thus, the memory in the adapter is independent of the host address space and of host management. FIG. 5 provides an overview mapping of the adapter interface host address space used for accessing these registers. The registers include primarily a transmit area register (XMIT AREA) at offset 0010(hex), a transfer area register (XFER AREA) at offset 0800(hex), and a look buffer (LOOKBUF) at offset 100C(hex). Various status, statistics, information, and indication registers are distributed throughout the balance of the area.

The XMIT AREA register is used by the host to write transmit descriptors into the adapter. The transmit descriptors are described in more detail below, but include data that identifies data to be compiled and transmitted as a frame, and may include immediate data. The XMIT AREA at offset 0010(hex) is approximately 2 K bytes in size. This data is mapped into a transmit descriptor ring in the independent adapter memory as described below.

The XFER AREA at offset 0800(hex) in the adapter interface host address block is a buffer of approximately 1 K byte through which transfer descriptors are written into the independent memory of the adapter. The LOOKBUF area at offset 100C(hex) is a buffer of approximately 2 K bytes providing a read only window into a receive ring buffer within the host independent adapter memory.

FIG. 7 provides a map of the host independent memory on the adapter. This memory is organized into a transmit data buffer at offset 0 of approximately 3 K bytes, a transmit descriptor ring at offset 0C00(hex) of approximately 5 K bytes, a receive buffer ring at offset 2000(hex) of approximately 22 K bytes, and a transfer descriptor area at offset 7800(hex) of approximately 1 K bytes is provided in the independent memory. The last three areas of memory include adapter information, network statistics, and multicast address tables for use by the adapter.

In the preferred system, the adapter uses 32 K bytes of static RAM for the transmit buffers, receive buffers, control structures, and various status and statistics registers. Several of the regions in the adapter's memory defined in FIG. 7 provide defined data structures.

A. Transmit Data Buffer

The transmit data buffer occupies 3 K bytes as mentioned above. This region is divided into two 1.5 K buffers. Only the data that are downloaded to the adapter via bus master transfers are stored in these buffers. The controller will use both the contents of the transmit data buffer and the immediate data portion of the transmit descriptors, when encapsulating a frame for transmission. The adapter automatically alternates the use of the buffers after choosing the buffer closest to the base of the memory as the power up default.

The transmit buffers are shared by the download DMA logic and the transmit DMA logic. The transmit DMA logic may switch from buffer 0 to buffer 1 and back again freely. The only restriction being the availability of transmit data as defined by the transmit start threshold register. The transmit DMA module switches from one buffer to the other whenever it has completed a transmission. The buffer switch occurs regardless of whether or not the transmission was successful and regardless of whether or not bus master download data were used in the preceding transmission.

The download DMA module may only switch from one buffer to the other, if the buffer it is going to switch to is not being used by the transmit DMA module. Download DMA will attempt to switch from one buffer to another every time it completes processing of a transmit descriptor as described below, regardless of whether or not any bus master operations were called for in the preceding descriptor. However, it will not change to a buffer that is in use by the transmit DMA module.

B. Transmit Descriptors

Transmit descriptors define frames that are pending transmission, and hold the status of frames that have been transmitted. These descriptors are of variable length and are arranged in a sequential fashion around a 5 K byte ring buffer as mentioned above. The first entry of the descriptor must align on a double word boundary. FIG. 8*a* illustrates the transmit descriptor data structure.

The bulk of the contents of an entry into the transmit descriptors region is copied verbatim from the data supplied by the host processor via the XMIT AREA illustrated in FIG. 6. However, in order to comply with the format requirements of the XMIT PROT ID and XMIT FRAME STATUS registers and to supply sufficient information for frame transmission and buffer management; one value must be relocated and several must be deposited automatically.

The host processor's writes to the XMIT AREA are offset automatically by the adapter such that the first value written—XMIT PROT ID and XMIT REQ HANDLE—end up in the fifth 32 bit word location (offset 10(hex)) in the next available data structure in the ring. This means that the XMIT REQ HANDLE value is written by the host to the location reserved for the MACID value. Immediately after the XMIT REQ HANDLE value is written to the adapter's RAM, the adapter must copy the contents of the least significant 16 bits of the fifth 32 bit word location to the most significant 16 bits of the fourth 32 bit word location. After copying XMIT REQ HANDLE, the adapter will retrieve the MACID value from the MACID register and write that to the location vacated by XMIT REQ HANDLE. Later, after frame transmission, the least significant 16 bits of the fourth 32 bit location (offset C(hex)) will be updated with the transmit frame's status.

The NEXT DESCRIPTOR POINTER entry may be updated by the adapter any time after the XMIT BUFFER COUNT and XMIT IMMED LEN values have been written to the adapter. Because the data written to the XMIT AREA register must be written in a precise order to exact locations, the writes of these two values can be easily detected and used for the descriptor size calculations required to determine the start of the next descriptor without having to retrieve the values from RAM.

Finally, once the last XMIT DATA LEN value has been written to the adapter, the frame length can be calculated and deposited in the FRAME LENGTH position of the data structure. This value is also copied to the XMIT FRAME LENGTH register in the controller chip for immediate use by the host.

The next several paragraphs define each of the fields of the transmit descriptor data structure.

The NEXT DESCRIPTOR POINTER value points to the first word of the next descriptor. This value is updated immediately after the host reads XMIT QUEUE STATUS. NEXT DESCRIPTOR POINTER being defined does not necessarily imply that the location pointed to contains a valid descriptor. It merely indicates where the next valid descriptor may be found once it is defined.

The FRAME LENGTH field is computed and updated by the adapter. The frame length is calculated by summing all of the XMIT DATA LEN values and the XMIT IMMED LEN value. The resulting sum is the total number of bytes in the transmit frame. If the sum is less than the 802.3 minimum frame length, then the sum will be set to the minimum frame length value. The sum is written to the FRAME LENGTH line of the transmit descriptor and is also made available to the host via the XMIT FRAME LENGTH register.

The XMIT FAILURE field contains the error code that is made up of the status bits gathered from the Ethernet transmitter after the completion of transmission. This field is mapped to the XMIT FAILURE register for host access.

The XMIT REQ HANDLE value is interpreted by the transmit DMA controller to determine whether or not to generate an indication upon completion of the transmission attempt(s) for the associated frame. If the field is non-zero, an indication will be generated. Also, the frame's entry in the transmit descriptor ring will be maintained until the host has had an opportunity to examine the transmit status. The XMIT REQ HANDLE, XMIT STATUS, XMIT PROT ID, and the MACID fields are all made available to the host when an indication is generated. If XMIT REQ HANDLE is a zero, then the transmit descriptor queue entry is discarded after transmission without notifying the host in any way. Transmit underrun conditions are posted regardless of a zero XMIT REQ HANDLE.

The XMIT STATUS field contains the transmit status for the associated frame. The contents of this field are updated immediately after the transmission attempt(s). The return codes are defined in the XMIT STATUS register definition.

The XMIT PROT ID value in this field is merely maintained within the queue for use by the host upon completion of the transmission to identify the particular protocol responsible for the frame. It allows simultaneous activity of multiple protocols. Together XMIT PROT ID and XMIT REQ HANDLE uniquely identify a frame passing through the adaptor.

The MACID, like XMIT PROT ID, is maintained within the queue for use upon completion of the transmission. However, the host does not write this value to the adapter via the XMIT AREA register. Rather, the host stores this value once in the MACID register and then depends upon the adapter to deposit this value into the descriptor data structure after XMIT REQ HANDLE has been copied to its final position.

The contents of the XMIT BUFFER COUNT field are supplied by the host via a write to XMIT AREA. This field specifies the number of buffers within the host's memory that are used to make up the transmit frame. Each of the buffers is transferred in the order listed from the host's memory to the adapter's transmit data buffer as soon as one of the two transmit data buffers becomes available. If XMIT BUFFER COUNT is zero, then no bus master operations will be performed for this frame.

The XMIT IMMED LEN field, defined by a write from the host to XMIT AREA, specifies the number of "immediate" data bytes that will be supplied by the host. If this field is zero, then the next 32 bit word location will contain the first host data buffer descriptor and the entire frame will be transferred to the adapter via bus master cycles. The XMIT IMMED LEN value will not necessarily be a multiple of four. The location of the first host data buffer descriptor is determined as follows: DESCRIPTOR OFFSET=((XMIT IMMED LEN+3) & fffc(hex))+18(hex);

The variable length IMMEDIATE DATA field contains the immediate data deposited to the adapter by the host using memory writes to XMIT AREA. This field may vary in length from 0 to 1,514 bytes. Immediate data is inserted into a transmit frame between the preamble and the transmit buffer data (if any) by the adapter during transmission. Generally, immediate data is made up of the destination and source addresses and any protocol-specific header data. It is reasonable, however, for the entire transmit frame to be considered immediate data. This would make it unnecessary for the adapter to perform any bus master operations to fetch the remainder of the transmit frame. If XMIT IMMED LEN is zero, then this field is skipped and the entire frame is assumed to reside in host memory resident data buffers. If XMIT IMMED LEN does not specify an integral number of double words, then the host may round up to the nearest multiple of 4 and write up to that number of bytes. The extra bytes, beyond XMIT IMMED LEN, will be ignored and not included as part of the transmitted frame.

The XMIT DATA LEN field, one of two entries per host data buffer descriptor, defines the number of bytes in the associated host buffer. This value need not be a multiple of four.

The 32 bit XMIT DATA PTR value is the physical starting address of the associated host data buffer. This value need not be a multiple of four.

C. Receive Buffer

The receive buffer is a 22 K byte ring of variable length receive frames. Each frame is preceded by a header that defines the frame's size and status and the location of the header of the next frame in the ring buffer.

The beginning of a receive frame entry in the ring can begin on any 32 bit word boundary.

The 32 bit NEXT RCV PTR value contains the address of the NEXT RCV PTR value of the next entry in the ring. This value becomes valid upon completion of the reception of the present associated frame. The buffer pointed to by NEXT RCV PTR may not necessarily contain a valid frame. This must be determined by the ring maintenance pointers that determine the beginning and end of the valid entries within the ring.

The RCV FRAME STATUS word contains the various error codes regarding the condition of the associate frame. RCV FRAME STATUS is updated immediately after frame reception. The contents of this entry are made available to the host via the RCV FRAME STATUS register.

The upper 16 bit word of the RCV FRAME SIZE entry is occupied by the adapter's MACID value. This value is retrieved from the MACID register and deposited in this word of the receive buffer data structure at the same time that the RCV FRAME SIZE value is posted.

The length of the received frame is deposited in the RCV FRAME SIZE register immediately after the frame has been received. The contents of this entry are made available to the host via the RCV FRAME SIZE register.

The RECEIVE DATA field varies in length from 1 to 1,514 bytes. The receive frame—starting with the destination address—is stored in this field as the frame is being received.

D. Transfer Descriptor

The adapter in one preferred implementation accommodates one and only one transfer descriptor at a time. Attempts to download a second descriptor while the first one is being processed will result in a return code from the XFER QUEUE STATUS register that indicates a lack of resources to accept the request. Only the frame currently visible via the LOOKBUF is acted upon by the transfer specification within the XFER AREA register.

The transfer descriptor is stored in adapter RAM using the format of FIG. 8b.

The TD OFFSET word defines the offset into the received frame from which the transfer will commence. This value need not be a multiple of four. Data that the host has already examined (via the LOOKBUF) may not need to be transferred to the host. Therefore, a non-zero value written into the TD OFFSET field will cause the bus master circuit to offset its start address by TD OFFSET bytes before beginning the transfer. This value may range from zero (transfer from the beginning of the frame) to 1,514.

The number of length/pointer pairs is defined in the TD BUFFER COUNT field. As many a 127 entries are allowed. Beyond that, XFER AREA buffer exhaustion is assured. This value must be non-zero.

The TD DATA LEN field contains the size of the host's receive buffer into which receive data will be transferred. The adapter is not restricted to transferring only 32 bit words. Attempting to transfer more than the maximum frame length of 1,514 bytes will cause the adapter to terminate the transfer upon reading the end of the frame.

The 32 bit TD DATA PTR value is the physical address of the first byte of the host's receive buffer. This value need not be a multiple of four.

The physical address of the data buffer in the host to which a received frame will be uploaded is written to the adapter as a 32 bit TD DATA PTR value in XFER AREA. The adapter will use this value as a pointer to the first byte in the receive buffer. There are no restrictions placed on the value of this pointer by the adapter. Byte, word and double word alignment of the buffer data are all supported.

E. Adaptor Info, Network Statistics, Multicast Address Tables

The adapter info, network statistics, and multicast address tables in the adapter RAM memory are utilized for various functions by the adapter, as will be understood by those skilled in the art, not directly relevant to the transmit and receive operation subject of the present application.

IV. Transmission Process

Figure 9:
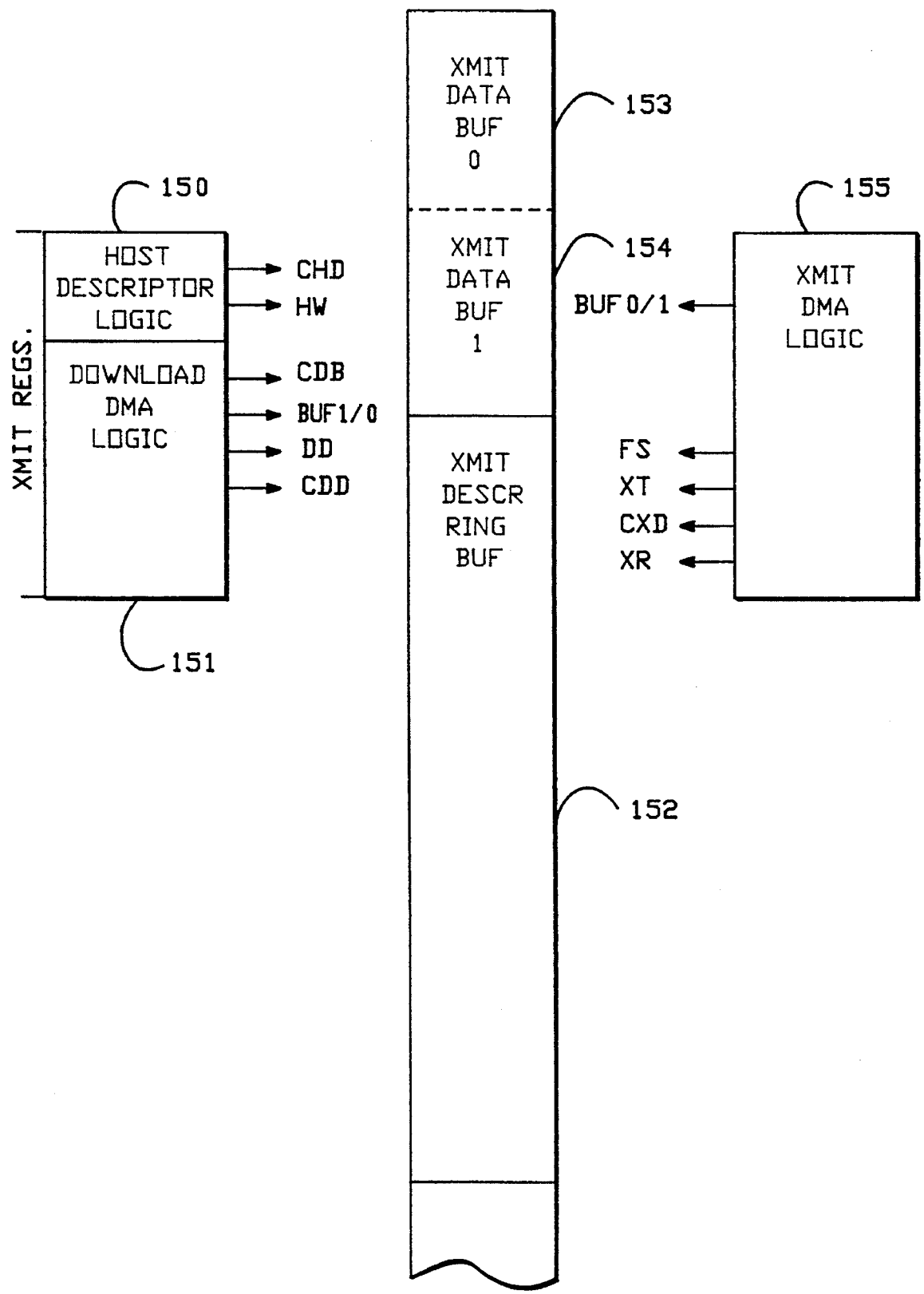
FIG. 9 illustrates the management of the transmit descriptor ring buffer and transmit data buffer, and pointers used during the transmit operation according to the present invention.
Figure 10:
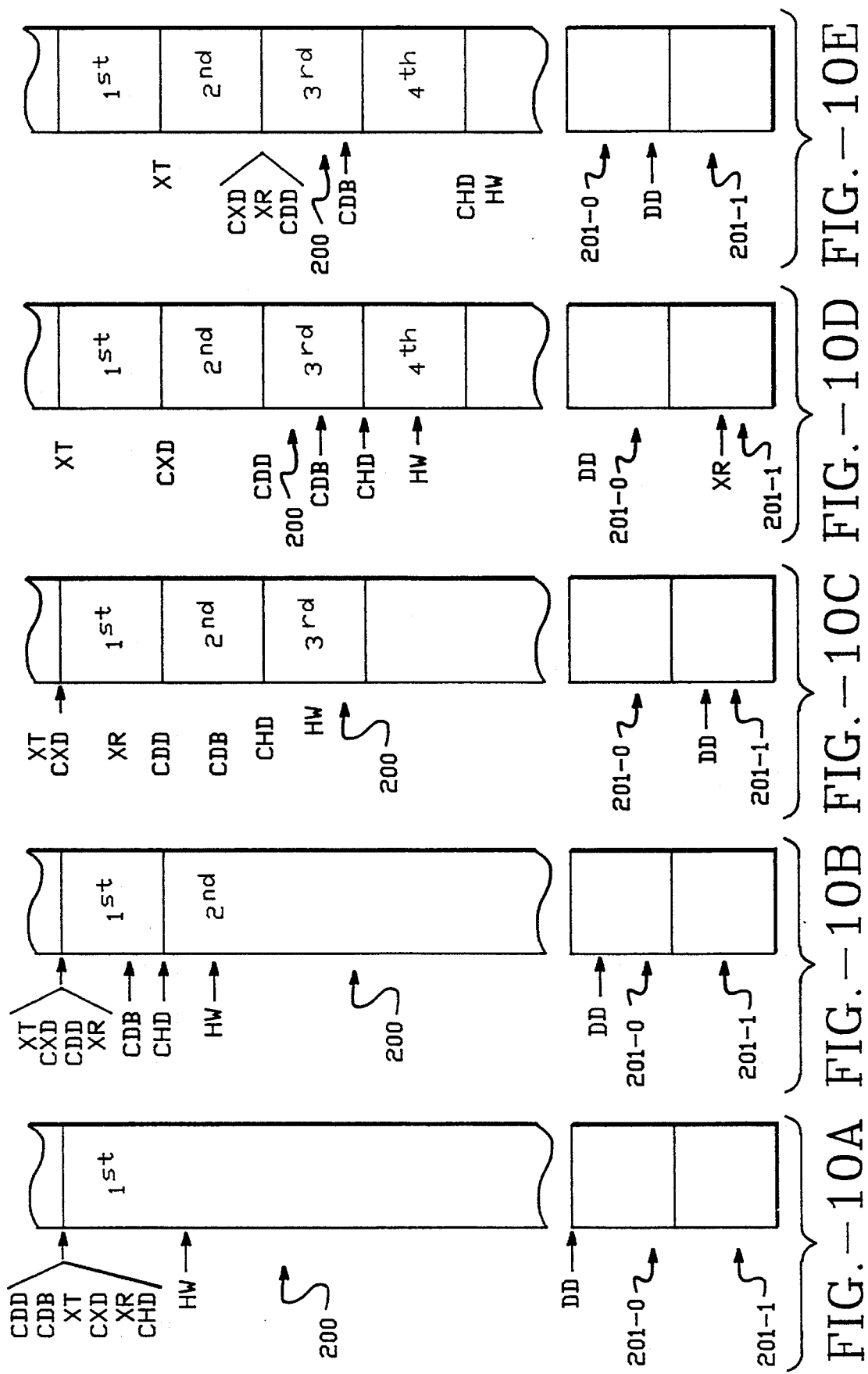
FIGS. 10a–10e are a schematic illustration of the management of the pointers for the transmit descriptor ring buffer and transmit data buffer.

FIG. 9 illustrates the network interface logic and host interface logic used in managing the transmit data buffer and transmit descriptor ring buffer in the independent memory on the adapter. On the host interface side, the logic includes host descriptor logic 150 and download DMA logic 151. The host descriptor logic 150 and download DMA logic 151 are coupled to the host address space through the transmit "registers" including the XMIT AREA register, the XMIT COMPLETE THRESH register, the XMIT FAILURE register, the XMIT FRAME LENGTH register, the XMIT FRAME STATUS register, the XMIT PROT ID register, the XMIT QUEUE STATUS register, and the XMIT START THRESH register. Details of these registers are described below.

The descriptors illustrated in FIG. 8a are stored in the transmit descriptor area of the host independent RAM on the adapter by host writes to the XMIT AREA address block. Three different processes act upon entries in the descriptor queue. The host writes to initially create transmit descriptors, bus master downloads to move buffer data from host memory to the transmit data buffer and transmission of described frames on the network. The first two processes occur within the download DMA logic 151 and the host descriptor logic 150. Transmission is performed by the transmit DMA logic 155. During the course of adapter operations, the number and status of descriptors in the transmit descriptor ring buffer 152 will vary according to the relative speeds of the host write, download, and transmission processes.

Two variables within the download DMA logic 151 helped describe the status of the transmit descriptor queue. ZERO DOWNLOADS PENDING indicates that there are no complete frame descriptors yet to be processed by the download DMA logic 151 for download. The ZERO FRAMES RESIDENT variable indicates that there are no descriptors which have been already processed by the download process, but are yet to be transmitted.

Each of the three processes that make up the transmission mechanism maintains its own set of pointers to the descriptor queue.

The host descriptor logic 150 generates pointers for the transmit descriptor ring buffer 152 on the adapter memory, which identify the current position of host accesses for writing descriptors in the transmit descriptor ring buffer 152. These pointers are designated the current host descriptor pointer CHD, and the host write pointer HW. The current host descriptor pointer CHD points to the base address of a descriptor currently being written, or expected to be written by the host. The host write pointer HW points to the location within the current descriptor (pointed to by the CHD pointer) to which the host is expected to write next. That is, the HW pointer predicts the offset within the XMIT AREA address block at which the host will be writing to complete the current descriptor.

The download DMA logic 151 generates 3 pointers, and a buffer select signal, while managing downloads from the host system into the transmit data buffers XMIT DATA BUF0 153 and XMIT DATA BUF1 154. The pointers generated by the download DMA logic 151 include the current download descriptor pointer CDD which points to the base address of a descriptor that is currently being processed by the bus master download DMA logic 151. The second pointer generated by the download DMA logic includes the download data pointer DD which points to the location within the current transmit data buffer (either XMIT DATA BUF0 or XMIT DATA BUF1) to which the download process is writing data. The third pointer generated by the download DMA logic 151 includes the current download buffer CDB pointer. The CDB pointer points to the buffer descriptor within the transmit descriptor pointed to by the CDD pointer, in which the specification of the buffer in host memory subject of a current download process resides.

The download DMA logic also selects the current transmit data buffer 153 and 154 to which the download DMA logic transfers data in the bus master operation as heuristically illustrated by signal BUF1/0.

The transmit DMA logic 155 generates three pointers for the transmission process. These pointers include the current transmit descriptor CXD pointer, which points to the base address of the descriptor in the transmit descriptor ring buffer 152 currently being processed by the transmit logic 155. The transmit read XR pointer indicates the location within the current descriptor or current transmit data buffer (153 or 154) from which the transmission process is reading data to be transmitted.

The XMIT TAIL pointer (XT) points to the back end of the queue. The XT pointer points to an older descriptor in the transmit descriptor ring buffer 152 than the CXD pointer when there are frames that have completed transmission, but have not yet had their status information read by the host system.

The preferred system operates in two modes relative to generating indications to the host of the completion of a transmission. The preceding paragraphs described the data structures associated with host write, bus master download, and transmission processes when a XMIT COMPLETE ON DOWNLOAD variable is false and the indicator is generated when the transmission is complete, or when XMIT COMPLETE THRESH (described below) is met. When XMIT COMPLETE ON DOWNLOAD is true, the download DMA logic 151 is also responsible for keeping track of the frames for which status has not been read. In this mode, the host receives the transmit complete indication for a frame upon download of the frame. So it is possible that the frame can be transmitted before the host is able to respond to the indication. This condition allows the XMIT TAIL pointer to no longer define the oldest useful entry in the descriptor ring buffer. Therefore, a frame status process is necessary. The frame status pointer FS points to the base address of the oldest descriptor for which status has not yet been read by the host, in this mode of operations. Since the FS pointer is related to the transmit process, it is illustrated heuristically in the transmit DMA logic 155 in FIG. 9. In the preferred system, however, it is logically coupled with the download DMA logic 151.

The transmit DMA also selects the current transmit data buffer 153 or 154 from which a current transmit frame is being composed, as indicated heuristically by the signal BUF0/1.

The interface to the adaptor is seen by the host as if it were a set of registers at a prespecified address block. The significant "registers" involved in transmission are outlined below.

A. XMIT AREA

The purpose of this register is to provide a mechanism for the host to supply the adapter with immediate data and a data structure that defines where in the host's memory system the remainder of the frame (if any) resides. The adapter stores this information in the transmit descriptor ring 152 for use when the frame being described can eventually be transmitted.

The adapter uses the address to which the data is written and the order in which it is written to determine what the data represents. The data must be written to the adapter using the structure and order described above with respect to FIG. 6.

Bus master downloads begin after a descriptor has been written to XMIT AREA and XMIT QUEUE STATUS (described below) has been read by the host.

Once the host has completed the transfer of the transmit descriptor buffer structures to XMIT AREA, the host may read XMIT FRAME LENGTH to determine the number of bytes that the host has specified to be included in the transmit frame. XMIT QUEUE STATUS should then be read to advance the CHD pointer so that another frame may be written to this register. After reading XMIT QUEUE STATUS, the contents of XMIT FRAME LENGTH are undefined, until XMIT AREA is filled again.

The actual frame transmission onto the network will commence when two conditions are met: (1) the XMIT START THRESH (described below) condition has been met, or, if XMIT START THRESH is zero, when the entire frame has been copied to the adapter's RAM, and (2) when there are no previously queued transmit requests. If more than XMIT START THRESH bytes of immediate data are written to XMIT AREA, then network transmission may begin before XMIT QUEUE STATUS is read.

If the adapter runs out of XMIT AREA resources while the host is writing data to XMIT AREA, the host will be returned a value of 6 when it reads XMIT QUEUE STATUS. The writes that ended up "off the end" of the memory will not do harm to any data already queued up on the adapter.

The transit frame's destination and source addresses must be explicitly supplied to the adapter for each transmit frame by the host. This information can be provided as part of the immediate data or, if there is no immediate data, as the first fourteen bytes of the first data buffer specified in the descriptor.

Essentially, the host provides every byte of the frame between the start of frame delimiter and the frame check sequence (CRC) through the XMIT AREA register or download DMA operation.

Although in general data must be written to XMIT AREA in the order specified, one exception exists. XMIT BUFFER COUNT/XMIT IMMED LEN may be rewritten after the initial values for these fields have been written, and before any buffer descriptor entries have been written.

The following restrictions apply:

1. When rewriting XMIT BUFFER COUNT/XMIT IMMED LEN, the new value of XMIT IMMED LEN cannot specify a value smaller than the number of immediate data bytes already written to XMIT AREA. It may specify a greater number. If the number is greater, then the remaining immediate data bytes (and any buffer descriptors) shall be written after the new XMIT BUFFER COUNT/XMIT IMMED LEN value is written.

2. When rewriting XMIT BUFFER COUNT/XMIT IMMED LEN, the complete 32 bit quantity must be rewritten, even if one of the values remains the same. The capability to rewrite XMIT IMMED LEN is included to facilitate direct movement of data from one receiving adaptor to another transmitting adaptor in the host system.

The operating sequence is as follows:

1. The receiving adapter gives an early receive indication to the host.

2. The host, upon determining that the receive frame should be transmitted on the second adapter, sets up a transmit descriptor in XMIT AREA for the second adaptor specifying a maximum length, all immediate data frame.

3. The host then sets up a bus master transfer on the receiving adapter that specifies the transmitting adapter as the destination of the transferred data. As data are received on one adapter, they are bus-mastered by the receiving adapter into the other's XMIT AREA.

4. When the frame reception finishes, the host determines the frame length, and writes that value into the transmitting adapter's XMIT IMMED LEN field.

B. XMIT COMPLETE THRESH

XMIT COMPLETE THRESH provides for an early indication of transmission completion. (Read/write, 4 bytes, 1 32 bit word.)

The XMIT COMPLETE THRESH register is used to specify the number of transmit bytes that remain to be either transmitted or downloaded to the adapter (depending upon the adaptor mode) before the adapter will issue a XMIT COMPLETE indication. Only bits 10 through 0 are implemented in this register. Values greater than the maximum frame length will prevent this function from operating properly. The method for disabling this function is to set the register to zero. The value in XMIT FRAME LENGTH (see below) is used to determine where the end of the transmit frame is.

If this threshold value is set too high, then the host will respond to the indication before the adapter can provide a valid transmit status indication. If XMIT FRAME STATUS returns a ff(hex), then XMIT COMPLETE THRESH should be adjusted to delay the indication slightly. This is accomplished by reducing the value in XMIT COMPLETE THRESH register. The function of this register is disabled during the transmission of the first 60 bytes of the frame. This register is cleared to 0 during a reset.

C. XMIT FAILURE

XMIT FAILURE returns the cause of a transmit failure. (Read only, 4 bytes, 1 32 bit word.)

This register returns the cause of the failure of the attempt(s) to transmit a queued frame. A non-zero value indicates that the frame encountered one or more errors during the transmission attempt.

The bits in this register are defined as follows:

| bit 0 | DMA UNDERRUN |
| bit 1 | LOSS OF CARRIER SENSE |
| bit 2 | MAX COLLISIONS |
| bit 3 | SQE TEST FAILED |

This register will contain valid data regardless of the success or failure of the attempt to transmit a frame. If there was no failure, then this register will contain a value of 0(hex). The contents of this register are valid after the frame has completed transmission (low byte of XMIT FRAME STATUS not equal to ff(hex)) and before XMIT PROT ID is read.

If a data underrun occurs, the adapter will force a CRC error into the frame during transmission to assure that the frame is received as a bad frame and is discarded by the destination device.

D. XMIT FRAME LENGTH

XMIT FRAME LENGTH returns the number of bytes to be transmitted. (Read Only, 4 bytes, 1 32 bit word.)

The XMIT FRAME LENGTH register returns the total number of bytes queued up for transmission by the current transmit frame descriptor identified by CXD pointer. This value is the total of the number of immediate data bytes and of all of the buffer length fields downloaded to the adapter for this frame. The value returned by this register does not reflect the effects of any padding of the frame that may be done by the adapter when the frame is less than 60 bytes in length.

The XMIT FRAME LENGTH register becomes valid immediately after the host writes the last byte to XMIT AREA and remains valid until the first write to XMIT AREA after a read of XMIT QUEUE STATUS.

E. XMIT FRAME STATUS

XMIT FRAME STATUS returns the results of a transmit attempt. (Read only, 4 bytes, 1 32 bit word.)

The least significant 16 bits of this register return the status of the attempt(s) to transmit a queued frame. The most significant 16 bits returns the XMIT REQ HANDLE for the frame. A value of XXXX0000(hex) (XXXX is the XMIT REQ HANDLE for this particular frame) is returned for a successful transmission while XXXX000a(hex) is returned for a failed transmission. XXXX00fe(hex) is returned if the adapter is in the process of retrying a transmission after a collision. If the transmission is still in progress, XMIT FRAME STATUS will return a XXXX00ff(hex).

If the frame was not transmitted successfully the specific cause of the transmit failure is available in XMIT FAILURE. Reading XMIT PROT ID advances XMIT FRAME STATUS to the status of the next transmitted frame, if any. If the "retry" status value is returned when XMIT FRAME STATUS is read, then reading XMIT FRAME STATUS will also clear the XMIT COMPLETE indication.

F. XMIT PROT ID

XMIT PROT ID returns the protocol ID of the transmit frame. (Read only, 4 bytes, 1 32 bit word.)

As soon as the adapter has completed its attempt(s) to transmit a queued frame and has posted its status, XMIT PROT ID can be read by the host as a method of identifying the frame. The value returned here is the same value that was written into the XMIT PROT ID field during the queuing of the frame via XMIT AREA.

Reading this register clears the XMIT COMPLETE indication except when the "retry" status value is read from XMIT FRAME STATUS. If "retry" was read, then reading XMIT FRAME STATUS will have cleared XMIT COMPLETE.

The XMIT PROT ID value resides in the upper 16 bits of the 32 bit register. The least significant 16 bits of this register will return the MACID value written to the MACID register. A double-word read will return both values simultaneously.

As multiple frames can be queued up for transmission, so can multiple transmission results be queued. Reading both words of XMIT PROT ID advances the completion status in XMIT FRAME STATUS, XMIT FAILURE, and XMIT PROT ID to the status of the next frame which has completed transmission, if any.

G. XMIT QUEUE STATUS

XMIT QUEUE STATUS returns the results of queuing a transmit frame. (Read only, 4 bytes, 1 32 bit word.)

A read of the XMIT QUEUE STATUS register returns the status of the host's attempt to queue up a transmit frame via XMIT AREA.

2(hex)—Success: If the transmit request was successfully queued, this value is returned when XMIT QUEUE STATUS is read.

6(hex)—Out of Resources: If the adapter runs out of queue storage RAM, then a status of 6(hex) is returned.

7(hex)—Frame Too Long: If the total number of bytes to be transmitted in a single frame exceeds the maximum frame length, this register will return a 7(hex).

a(hex)—Order Violation: If the data written to XMIT AREA is written out of order, then this error code is returned.

ff(hex)—Adapter Not Ready: If XMIT QUEUE STATUS is read too quickly after the completion of the writes to XMIT AREA, it is possible to read the status value before the queuing process is complete.

Reading this register also advances XMIT AREA so that another transmit may be queued. This register MUST be read after all of the data has been written to XMIT AREA and before the next transmit request is written to XMIT AREA.

If an error code (6(hex), 7(hex), a(hex), or ff(hex)) is returned by XMIT QUEUE STATUS, then the frame was not queued and the host will have to attempt to queue it up another time. Naturally, if the frame was flagged as being too long, it will have to be broken up into multiple frames before another queue attempt can be made.

If the code indicating success (2(hex)) is returned, then the host may immediately proceed to attempt to queue up an additional frame. The number of frames that can be queued depends on the amount of RAM on the adapter allocated for this purpose and the amount of immediate data included in each frame.

If the host attempts to queue a frame that is too large and also exceeds the available TRANSMIT DESCRIPTOR free space, the error that occurs first will take precedence and will be returned to the host.

H. XMIT START THRESH

XMIT START THRESH provides for an early begin of transmission. (Read/write, 4 bytes, 1 32 bit word.)

The XMIT START THRESH register is used to specify the number of transmit bytes that must reside on the adapter before it will start transmission. Only bits 10 through 0 are implemented in this register. Values greater than the maximum frame length will prevent this function from operating properly. The method for disabling this function is to set the register to zero. Bytes are counted starting with the first byte of the destination field of the transmit frame.

The number of bytes considered to be available is the sum of the immediate data written to XMIT AREA by the host and those bytes transferred to the transmit data buffers in the adapter using bus master DMA operations. The transmit request will be posted immediately after XMIT START THRESH transmit frame bytes are made available from the immediate data or when the adapter has bus-mastered XMIT START THRESH—XMIT IMMED LEN bytes onto the adapter.

The number of bytes resident on the adapter must be equal to or greater than the value in XMIT START THRESH for the transmission to commence, unless the total frame size is less than XMIT START THRESH. In that case, the frame will begin transmission when the entire frame has been copied to the adapter. The actual transmission of the frame may be delayed by previous pending transmit frames and by deferrals to network traffic. This register is set to zero during a reset.

I. TRANSMISSION RING MANAGEMENT

FIGS. 10A–10E illustrate the progression of the pointers used in the transmit operation. In FIGS. 10A–10E, a portion of the transmit descriptor ring (generally 200) and the transmit data buffers 201-0 and 201-1 are shown. Also, the pointers abbreviated as discussed above are indicated.

In FIG. 10A, the host descriptor logic is writing a first descriptor into the transmit descriptor ring 200. Thus, the CXD pointer points to the base address of the first descriptor, the HW pointer points to the offset from the base address to which the host is expected to write the next double word of the descriptor. The download pointers including CDD, CDB are also pointing to the base address of the first descriptor as no download operations have begun. Likewise, the transmit descriptors CXD and XR point to the same base address.

Finally, the tail of the ring XT points to the beginning descriptor. The download data pointer DD points to the top of a first buffer, for instance, buffer zero.

As illustrated in FIG. 10B, the first descriptor has completed writing and has begun the download process, and the host has begun writing a second descriptor. Thus, the host descriptor logic pointer CHD points to the base address of the next descriptor, and the HW pointer points to the expected address of the next byte. The download pointer CDD points to the base address of the first descriptor. The down DMA logic is assumed to be in the process of transferring buffers from host into the transmit data buffer. Thus, the CDB pointer points to a descriptor of a download buffer in the first descriptor, and the DD pointer points to an offset within the transmit data buffer at which data is being downloaded. No transmit operations are yet to begin because the threshold has not been reached. Thus, the transmit pointers and the tail pointer still point to the first descriptor.

In FIG. 10C, the host descriptor logic is working on a third descriptor, the download logic is working on the second descriptor, and the transmit logic is working on the first descriptor. The host descriptor logic pointers CXD and XR are working on the first descriptor. Thus, the CXD pointer points to the base address of the first descriptor, and the XR pointer points to immediate data being read for transmission by the transmit DMA logic.

The transmit read pointer XR will complete reading the immediate data and then move to the transmit data buffer filled by the download DMA logic when processing the first descriptor as illustrated in FIG. 10B.

The transmit tail pointer XT still points to base address of the first descriptor.

The download logic is working on the second descriptor. Thus, the CDD pointer points to the base address of the second descriptor, the CDB pointer points to a buffer descriptor within the second descriptor, the DD pointer points to an offset within the second transmit data buffer to which the download DMA logic is transferring data from the host.

In FIG. 10C, the host is writing a third descriptor into the XMIT AREA register. Thus, the CHD pointer points to the base address of the third descriptor, and the HW pointer points to the offset to which the next byte is expected to be written by the host.

In FIG. 10D, the process has moved on so that the host is writing to a fourth descriptor. Thus, the CHD pointer points to the base address of the fourth descriptor, and the HW pointer points to the expected address of the next write to the XMIT AREA register.

The download logic is working on the third descriptor. Thus, the CDD pointer points to the base address of the third descriptor, the CDB pointer points to a buffer descriptor within the third descriptor, and the download data DD pointer points to a location in the first data buffer at which the download is occurring. This operation assumes that the transmit of the first descriptor has freed up the first data buffer for use by the download logic.

The transmit logic is working on the second descriptor. Thus, the CXD pointer points to the base address of the second descriptor, and the XR pointer points to a location in the transmit data buffer from which data is being read by the transmit logic. Since the status of the first descriptor is yet to be read, the transmit tail XT pointer still points to the base address of the first descriptor.

In FIG. 10E, the process is assumed to have progressed so that the write of the fourth descriptor is completed, but the host has ceased writing new descriptors temporarily. In this case, the CHD pointer and the HW pointer point to the base address of a fifth descriptor waiting for further actions by the host. It is assumed that the download process has yet to complete downloading the third descriptor. Thus, the current CDD pointer points to the base address of the third descriptor, and the CDB pointer points to a buffer descriptor within the third descriptor. The DD pointer points to a location in the transmit data buffer to which the download process is downloading data.

In FIG. 10E, it is also assumed that the transmission of the frame identified by the second descriptor is complete, and the transmit logic is waiting for the download operation on a third descriptor to either complete, or download sufficient data that the transmit logic may begin transmission. Thus, the CXD and the XR pointers point to the base address of the third descriptor.

This process continues with automatic ring wraparound of the descriptors handled by the adapter. Also, the underrun condition is monitored and appropriate error signals indicated by the adapter.

V. Receive Process

Figure 11:
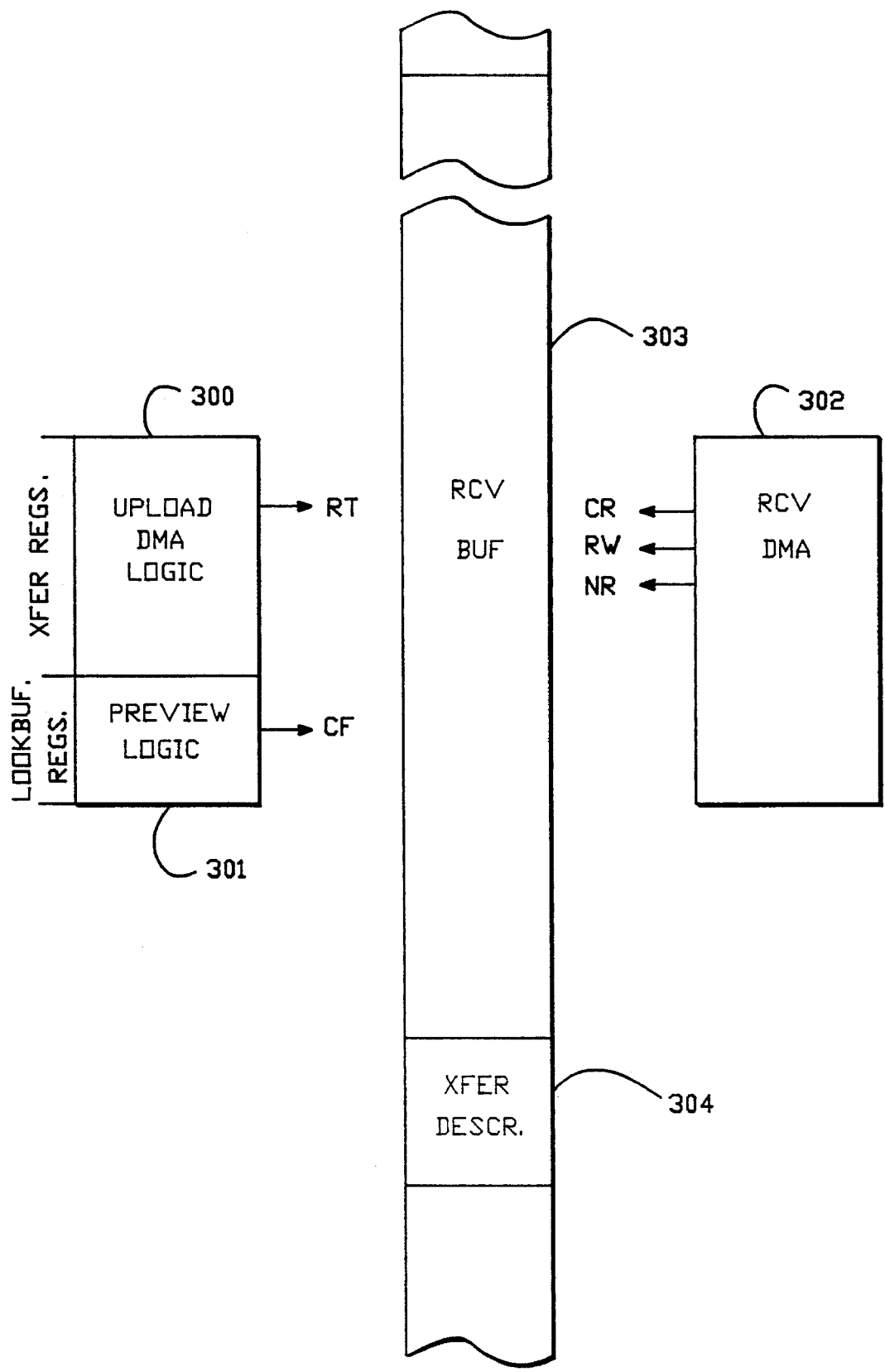
FIG. 11 is a heuristic diagram illustrating the operation of the receive ring buffer and a transfer descriptor buffer, along with pointers generated by the host and network interfaces to manage these buffers.

FIG. 11 is a heuristic diagram of the host interface logic and the network interface logic which is involved in the receive function. The host interface logic includes the upload DMA logic 300 and the view logic 301. The upload DMA logic 300 interfaces with the host through the XFER address block described below. The view logic 301 interfaces with the host through LOOKBUF and related address blocks described below.

The network interface logic includes the receive DMA logic 302. Both the host interface logic and network interface logic interface with the receive ring buffer area 303 in the host independent adapter memory. Also, the upload DMA logic 300 interfaces with the transfer descriptor area 304 within the host independent adapter memory.

This logic is also responsible for maintaining the receive buffer ring. Thus, a plurality of pointers are involved. The upload DMA logic generates a receive tail pointer RT which points to the base address of a frame being uploaded, which is also the tail end of the ring. The view logic generates a current frame pointer CF which points to the base address of LOOKBUF in the adaptor memory, or a frame being viewed by the view logic 301.

The receive DMA logic 302 generates a current receive pointer CR, pointing to the base address of a frame being received, a receive write pointer RW pointing to a location where data in the current frame is being written. The receive DMA logic 302 also generates a next receive pointer NR which points to the starting position of a next receive frame during status posting.

An understanding of the receive process can be gained from an understanding of the host address map involved.

A. LOOKBUF

The LOOKBUF register is used by the host to examine and/or transfer received frames. (Read only, 2036 bytes, 509 32 bit words.)

The host can use the LOOKBUF register to examine all of part of a received frame. The reads may be of any width and in any order. LOOKBUF uses the least significant eleven address bits of the host's address bus to select the bytes being accessed. The host can examine a portion of the frame and then use the bus master capabilities of the upload DMA logic 300 to transfer the remaining portion of the frame. Alternately, the host can both examine the frame and transfer the contents to the host memory using memory move instructions.

The received frames are always aligned within LOOKBUF such that the destination address field begins at byte zero of the register. The host cannot assume anything about the data read beyond the end of the current frame. The next receive frame is not guaranteed to be there. The host must use a write to RCV DONE to advance LOOKBUF to the next receive frame buffer.

B. RCV BYTES AVAIL

RCV BYTES AVAIL returns the number of valid bytes in LOOKBUF. (Read only, 4 bytes, 1 32 bit word.)

This register provides a running count of the number of bytes that have been received for the current frame. The maximum value to which this register may count is bounded by the value a register RCV MAX AVAIL (not described further).

When read as bytes, the register will store the value of bits 10 through 8 when bits 7 through 0 are read. This ensures integrity of the read of this dynamic register.

C. RCV DONE

RCV DONE allows LOOKBUF to advance to the next frame. (Write only, 4 bytes, a 32 bit word.)

A write of an arbitrary value to the least significant byte of this register will cause LOOKBUF to advance to the next receive frame (if any). RCV BYTES AVAIL, RCV FRAME SIZE and RCV FRAME STATUS are all similarly updated.

The frame that was in LOOKBUF at the time that RCV DONE was written to cannot be restored to LOOKBUF. The adapter will preserve the frame both in its internal receive buffer and in LOOKBUF until RCV DONE is eventually written to. Although the data in LOOKBUF is no longer visible once RCV DONE is written to, any data transfers that were initiated by writing to XFER AREA will complete successfully. The received frame's data will be preserved until the data transfer completes.

D. RCV FRAME SIZE

RCV FRAME SIZE returns the size of the current receive frame. (Read only, 4 bytes, 1 32 bit word).

RCV FRAME SIZE returns the size (in bytes) of the current receive frame in the lower 16 bits and the MACID value in the upper 16 bits. The length value is not posted and is therefore invalid until the adapter has completed reception of the frame. While the adapter is in the process of receiving the frame, the register will return XXXX0000(hex) where XXXX is the MACID value written to the MACID register.

This length value will remain valid until the host writes to RCV DONE. When a RCV DONE is issued, the least significant 16 bits of this register return to 0(hex). The length value is computed by counting all of the bytes from the first byte of the destination address field to the last byte of the data field, inclusive.

If an indication to the host is generated before the entire frame is received, the frame's size will be posted in this register at the completion of frame reception regardless of the final status of the received frame. The RCV FRAME STATUS register should be examined to determine if the frame was received without errors. This register may contain an incorrect value for frames that are received with errors (such as OVERSIZED FRAME).

E. RCV FRAME STATUS

RCV FRAME STATUS returns the status of the current receive frame. (Read only, 4 bytes, 1 32 bit word.)

RCV FRAME STATUS returns the condition of the current receive frame. This status is not posted, and is therefore invalid, until the adapter has completed reception of the frame.

The bits in this register are defined as follows:

| | |
|---|---|
| bit 0 | DMA OVERRUN |
| bit 1 | ALIGNMENT ERROR |
| bit 2 | BAD CRC |
| bit 3 | RUNT FRAME |
| bit 4 | OVERSIZED FRAME |

The contents of this register become valid immediately after the completion of the reception process and remain valid until the host writes to RCV DONE. If the adapter is configured to transfer the frame data to the host as it is being received and the frame is received with an error, the adapter will abort the bus master DMA sequence and return an error code to the host regarding the completion of the transfer. The host can at that time read RCV FRAME STATUS to determine if the frame was indeed defective.

In the event of a receive failure, and if the adapter is either configured to receive bad frames or it is enabled to transfer frames during reception, the host must write to RCV DONE to free up the receive buffer on the adapter.

If the adapter generates an EARLY RCV indication or the LENGTH LEFT THRESH register causes a RCV COMPLETE indication, the adapter will receive the frame and post the receive status regardless of whether or not the frame was received with errors even if the adapter is not configured to receive bad frames. In this event, a write to RCV DONE must occur to acknowledge the receive and to discard the frame.

Reading this register acknowledges RCV COMPLETE.

F. XFER AREA

The XFER AREA register is used to supply the adapter with buffer pointers for the transfer of received frames. (Write only, 1,024 bytes, 256 32 bit words).

The purpose of this register is to tell the adapter where in the host memory system the "current" receive frame should be transferred. This is accomplished by writing one or more sets of pointers to this register.

XFER AREA is a write only register that uses the least significant eleven bits of the host's address bus to determine the function of each parameter. The transfer specification must be written to XFER AREA using the structure of FIG. 6.

The actual data transfer is initiated by a read from XFER QUEUE STATUS. If the adapter was able to accept the transfer request without running out of RAM, then the adapter will begin transferring data to the host's memory. If the adapter runs out of memory in its transfer queue buffer, any additional writes to XFER AREA will be ignored. The host must resubmit any rejected transfer requests.

The "current" receive frame is defined as that receive frame that is presently available to the host via LOOKBUF. Receive frames are handled in the same order that they are received from the network. Once discarded by the host, a received frame may not be examined nor may a transfer be set up for it.

Received frames are disposed of by writing to RCV DONE. Until that write occurs, the current frame remains in LOOKBUF and may be transferred to the host an unlimited number of times. Once disposed of, the frame may not be examined or transferred. The disposal occurs immediately unless a transfer is in progress. If a transfer is in progress, then the disposal of the frame will not occur until the completion of the transfer.

G. XFER COMPLETE THRESH

XFER COMPLETE THRESH provides for an early transfer complete indication based on bytes left to transfer. (Read/write, 4 bytes, one 32 bit word.)

The XFER COMPLETE THRESH register is used to specify the number of bytes from the end of the frame that must be transferred to the host by the adapter before it will generate a XFER COMPLETE indication to the host. When the number of bytes remaining to be transferred is equal to or less than the value in XFER COMPLETE THRESH, the XFER COMPLETE indication will be set (if not masked). Only bits 10 through 0 are implemented in this register. However, values greater than the maximum frame length will prevent this function from operating properly. The preferred method for disabling this function is to set the register to zero.

If the XFER COMPLETE THRESH condition is met while the frame being transferred is still being received, XFER COMPLETE is suppressed until the frame is received. If XFER COMPLETE is suppressed in this manner, LENGTH LEFT THRESH will override the value in this register and will be used to generate an early XFER COMPLETE indication.

If the frame is fully received when the transfer is initiated, then the transfer length is the lesser of the actual frame length and the number of bytes requested to be transferred via XFER AREA. If the frame is still being received when the transfer is initiated, then its length is assumed to be the value of the length field plus 14. If the value of the length field is greater than 1,500, but not equal to 8137(hex) (i.e., a special frame type identifier), then the frame length is assumed to be 1500 bytes. Finally, if the length field contains 8137(hex), then byte 17 and 18 of the receive frame will be assumed to contain the frame's length value. This assumed length will be changed when the frame is entirely received to the lesser of the actual frame size and the number of bytes requested to be transferred.

This value can be tuned by the host as it determines how often it is responding too early to the transfer complete indication versus how often it is arriving late or on time. If the host is responding too early, XFER STATUS will return a ff(hex) indicating that the status is undefined and that the transfer will be completed shortly. This register is set to 0 during a reset.

H. XFER STATUS

XFER STATUS returns the status of a receive frame transfer. (Read only, 4 bytes, one 32 bit word.)

Reading this register will return the status of the receive frame transfer attempt. The possible return values are 0(hex) for success, a(hex) for failure, and ff(hex) for unknown. XFER STATUS is set to ff(hex) while a transfer is in progress. Transfer failures can be caused by excessive wait states encountered on the host bus or by the receive frame being defective. Reading this register will acknowledge (reset) XFER COMPLETE in an INDICATION REASON register.

VI. Interrupt and Indication Logic

Interrupts are generated by the network adapter in order to indicate to the host that asynchronous events deserve the host's attention. In one embodiment, the network adapter uses an EISA open-collector, level-sensed, shared interrupt design. In the EISA design, the network adapter must assert an interrupt and maintain the assertion of the signal until the cause of the interrupt has been serviced by the host. Multiple network adapters can assert the same interrupt line. The interrupt line will remain asserted until all network adapters release their interrupt assertion.

Before exiting the interrupt service routine, the host should recheck network adapter status registers. The registers may indicate that other asynchronous network adapter events have occurred during the interrupt service routine.

In one embodiment of the present invention, the following registers are resident in the Interrupt Controller Module 60 of FIG. 4 and are used to generate interrupts and/or indications to the host processor of network adapter events. Many of the registers are accessible by a host processor which may enable and/or disable generation of indications and interrupts by writing to mask registers.

A. INT REASON

When responding to an interrupt, the host may read the INT REASON register which is used to indicate to the host the cause of all pending interrupts. Bits 5 through 1 are implemented in this register. Bit 0 is set to zero. This allows a dispatch table of 16-bit offsets to be used to process the pending interrupts. All bits in this register are dependent upon the value stored in INDICATION MASK and INT MASK while some bits (RCV COMPLETE, EARLY RCV, and OTHER INT) are dependent upon INDICATION COUNTER.

The bits in this register are defined as follows:

| bit 1 | XMIT COMPLETE |
| bit 2 | RCV COMPLETE |
| bit 3 | EARLY RCV |
| bit 4 | XFER COMPLETE |
| bit 5 | OTHER INT |

Each of these bits has the same definition and purpose as the bits in INDICATION REASON which is described below.

None of the interrupt sources on the network adapter are acknowledged by reading INT REASON. Each source of the interrupts must be acknowledged individually in a manner that is specific to the type of interrupt. Generally, the acknowledge mechanism is a part of the normal status gathering process and imposes no additional overhead on the host processor. Interrupts are acknowledged by the host carrying out interrupt-specific actions. These actions are as follows:

XMIT COMPLETE is acknowledged by reading XMIT PROT ID.

RCV COMPLETE is acknowledged by reading RCV FRAME STATUS.

EARLY RCV is acknowledged by reading RCV BYTES AVAIL.

XFER COMPLETE is acknowledged by reading XFER STATUS.

OTHER INT is acknowledged by acknowledging the various interrupt indications shown in the OTHER INT register.

B. OTHER INT

The OTHER INT register is used to indicate to the host the cause of various miscellaneous pending interrupts. Only bits 1 through 4 are implemented in this register. Bit 0 is always set to ZERO to allow the use of a dispatch table of 16-bit off-sets.

The OTHER INT indication bit is set in INT REASON when any of the indication sources in this register are set.

The bits in this register are defined as follows:

| bit 1 | REQUESTED INT |
| bit 2 | XMIT UNDERRUN |
| bit 3 | STATISTICS UPDATE |
| bit 4 | XMIT RESOURCES AVAILABLE |

The REQUESTED INT bit is set when an interrupt is generated due to the host writing to INT REQUEST. This interrupt is acknowledged by reading INT REQUEST.

The XMIT UNDERRUN bit is set when an interrupt is generated because a transmit underrun error has occurred. This interrupt indicates that the rate of data transferred from the host to the adapter was slower then the rate of data transferred from the adapter to the network. The XMIT UNDERRUN interrupt can be used to program an appropriate value in XMIT START THRESH. This bit is set regardless of the value of XMIT REQ HANDLE written to XMIT AREA. This interrupt is acknowledged by reading XMIT START THRESH.

The STATISTICS UPDATE bit indication occurs when the most significant bit (bit 31) of an adapter—maintained statistic transitions from zero to a one. STATISTICS UPDATE is acknowledged by clearing STATISTICS COLLECTION EN in adapter mode.

The XMIT RESOURCES AVAILABLE indication is set when resources within the network adapter's TRANSMIT DESCRIPTOR BUFFER AREA has been freed up. This indication is acknowledged by writing to XMIT AREA.

C. INT MASK

The INT MASK register is used to prevent the indication sources which are set in INDICATION REASON and OTHER INDICATION from becoming set in INT REASON and OTHER INT. This prevents the indication sources from actually causing the adapter to assert the interrupt line to the host. In the present embodiment, only Bits 6 through 1 are implemented in this register, while a register using a single bit or n bits may be used in other embodiments to mask a single or n indication sources. Bit 0 is permanently set to zero. Individual indication sources are masked off by setting the corresponding mask bits to 1.

The bits are arranged within the register as follows:

| bit 1 | XMIT COMPLETE |
| bit 2 | RCV COMPLETE |
| bit 3 | EARLY RCV |
| bit 4 | XFER COMPLETE |
| bit 5 | REQUEST INT |
| bit 6 | XMIT UNDERRUN |

Indication sources masked off by entries in this register prevent the corresponding bits in INT REASON and OTHER INT from becoming set. This register does not affect which bits may be set in INDICATION REASON or OTHER INDICATION. During a reset, all of the bits in the active portion of the register are set to 1 if Bit 10 of RESET MASK is clear.

Masking an interrupt is not the same as masking an indication. When an interrupt is masked, but the indication is not masked, the interrupt indication bits can still become set in INDICATION REASON, but the interrupts that are masked will not be enabled to interrupt the host.

D. INDICATION REASON

As with INT REASON, the host may read the INDICATION REASON register when responding to an interrupt. The register is used to indicate to the host the asynchronous network adapter events which may or may not have caused the interrupt. Only Bits 5 through 1 are implemented in this register. Bit 0 is set to zero. This allows a dispatch table of 16-bit offsets to be used to process the pending interrupts. All bits in this register are dependent upon the value stored in INDICATION MASK and INT MASK while some bits (RCV COMPLETE, EARLY RCV, and OTHER INT) are dependent upon INDICATION COUNTER.

The bits in this register are defined as follows:

| bit 1 | XMIT COMPLETE |
|---|---|
| bit 2 | RCV COMPLETE |
| bft 3 | EARLY RCV |
| bit 4 | XFER COMPLETE |
| bit 5 | OTHER INDICATION |

Each of these bits has the same definition and purpose as the bits in INT REASON which is described above.

E. OTHER INDICATION

The OTHER INDICATION register has exactly the same format as OTHER INT. The distinction between the two registers is that any bit set in OTHER INT will cause an interrupt on the EISA bus, while the OTHER INDICATION is used to only indicate to the host various miscellaneous network adapter events. Only bits 1 through 4 are implemented in this register. Bit 0 is always set to ZERO. This allows for the use of a dispatch table of 16-bit offsets.

The OTHER INDICATION bit is set in INDICATION REASON when any of the indication sources in this register are set.

| bit 1 | REQUESTED INT |
|---|---|
| bit 2 | XMIT UNDERRUN |
| bit 3 | STATISTICS UPDATE |
| bit 4 | XMIT RESOURCES AVAILABLE |

The REQUESTED INT bit is set when an interrupt is generated due to the host writing to INT REQUEST. This interrupt is acknowledged by reading INT REQUEST.

The XMIT UNDERRUN bit is set when an interrupt is generated because a transmit underrun error has occurred. This interrupt indicates that the rate of data transferred from the host to the adapter was slower then the rate Of data transferred from the adapter to the network. The XMIT UNDERRUN interrupt can be used to program an appropriate value in XMIT START THRESH. This bit is set regardless of the value of XMIT REQ HANDLE written to XMIT AREA. This interrupt is acknowledged by reading XMIT START THRESH.

The STATISTICS UPDATE bit indication occurs when the most significant bit (bit 31 ) of an adapter—maintained statistic transitions from zero to a one. STATISTICS UPDATE is acknowledged by clearing STATISTICS COLLECTION EN in adapter mode.

The XMIT RESOURCES AVAILABLE indication is set when resources within the network adapter's TRANSMIT DESCRIPTOR BUFFER AREA has been freed up. This indication is acknowledged by writing to XMIT AREA.

F. INDICATION MASK

INDICATION MASK has a structure that is identical to and a function that is similar to the INT MASK. The INDICATION MASK register is used to prevent certain sources of indications from becoming set within INDICATION REASON and OTHER INDICATION. In the present embodiment, only Bits 6 through 1 are implemented in this register, while a register using a single bit or n bits may be used in other embodiments to mask a single or n indication sources. Bit 0 is permanently set to zero. Individual indication sources are masked off by setting the corresponding mask bits to a 1. The bits are arranged within the register as follows:

| bit 1 | XMIT COMPLETE |
|---|---|
| bit 2 | RCV COMPLETE |
| bit 3 | EARLY RCV |
| bit 4 | XFER COMPLETE |
| bit 5 | REQUESTED INT |
| bit 6 | XMIT UNDERRUN |

Indication sources disabled by this register will not set bits within INDICATION REASON, OTHER INDICATION, INT REASON, nor OTHER INT. During a reset, all the bits in the active portion of this register are set to 1 if Bit 10 of RESET MASK is clear.

G. INDICATION COUNTER

INDICATION COUNTER is used to determine the value of the internal indication counter. The internal indication counter relieves the host driver from requiring additional software to keep track of the enabling and disabling of interrupts in multiple host subroutines which require interrupts to be disabled. Reading this register has no effect upon the value of INDICATION COUNTER. Writing to INDICATION OFF and INDICATION ON will increment and decrement INDICATION COUNTER, respectively.

The internal counter is an 8-bit counter which will be limited to a count of ff(hex) until decremented. The number of writes to INDICATION OFF should not exceed the number of writes to INDICATION ON by more than 255. The INDICATION COUNTER will also be limited to 00(hex) if the number of writes to INDICATION ON exceed the number of writes to INDICATION OFF. INDICATION COUNTER is guaranteed to be set to 0 by performing 255 writes to INDICATION ON.

A non-zero INDICATION COUNTER will prevent all indication sources except XMIT COMPLETE, XFER COMPLETE, and XMIT UNDERRUN from being set in INDICATION REASON, OTHER INDICATION, INT REASON, and OTHER INT.

H. INDICATION OFF

A write of an arbitrative value to the least significant byte of INDICATION OFF will cause the network adapter INDICATION COUNTER value to be incremented by 1.

Only the least significant byte of this register is active, writes to the most significant three bytes are disregarded. During a reset, the INDICATION COUNTER value is set to zero if Bit 10 of RESET MASK is clear.

I. INDICATION ON

A write of an arbitrative value to the least significant byte of this register will cause adapter's INDICATION COUNTER value to be decremented by 1. Only the least significant byte of this register is active. Writes to the most significant three bytes are disregarded. During a reset, INDICATION COUNTER is set to zero if Bit 10 of RESET MASK is clear.

J. RCV INDICATE

The RCV INDICATE register provides a convenient means for the host driver to automatically re-enable indications after handling frame receptions, as well as some other indications. Because most host drivers do not allow the frame reception subroutine to be reentered, the driver will normally be required to mask RCV COMPLETE by incrementing INDICATION COUNTER by writing to INDICATION OFF prior to calling the frame reception subroutine. After the protocol has returned from the frame reception subroutine, the driver will write to RCV DONE to dismiss the current frame.

The current network adapter's architecture saves the host driver from having to explicitly decrement the INDICATION COUNTER. If the RCV INDICATE register contains a non-zero value when the host driver writes to RCV DONE, then INDICATION COUNTER will be automatically decremented, unmasking the RCV COMPLETE indication.

However, if the host driver wants RCV COMPLETE to remain masked after writing to RCV DONE the driver must clear RCV INDICATE prior to writing to RCV DONE. Clearing the RCV INDICATE will disable the adapter from automatically decrementing the INDICATION COUNTER when the driver writes to RCV DONE.

This register is used when the software of the host driver does not want to make explicit commands of writing to INDICATION ON and INDICATION OFF. For INDICATION COUNTER to be automatically decremented when RCV DONE is written to or INT REQUEST is read, the host must first make sure that RCV INDICATE is set to a non-zero value. During each write to RCV DONE or read from INT REQUEST, RCV INDICATE is reset to ff(hex). In order for INDICATION COUNTER to avoid being decremented, the host must exclusively clear RCV INDICATE prior to writing to RCV DONE or reading from INT REQUEST. If INDICATION COUNTER is zero and RCV INDICATE contains a non-zero value when RCV DONE is written or INT REQUEST is read, then INDICATION COUNTER will not be decremented, but will remain at zero. During a RESET, this register is set to ff(hex).

a. Interrupt Controller Register Configuration

FIG. 12 illustrates the relationship between the above registers. The various registers are connected in order to create a hierarchy of status information and control level of various indications and interrupt signals with their various masks. Indication sources pass through three masks before they cause interrupts to the host. INDICATION COUNTER 202 is the first mask which may selectively disable indications REQUESTED INT, RCV COMPLETE, and EARLY RCV. INDICATION COUNTER 202 is controlled by INDICATION ON, INDICATION OFF, and RCV INDICATE. When INDICATION COUNTER 202 is non-zero, RCV COMPLETE, EARLY RCV, and REQUESTED INT will be masked and will not be set in INDICATION REASON 206, OTHER INDICATION 205, INT REASON 210, or OTHER INT 209. Indication signals XMIT UNDERRUN, XFER COMPLETE, and XMIT COMPLETE cannot be selectively disabled by INDICATION COUNTER 202.

INDICATION MASK 204 is the second mask for the indication signals. INDICATION MASK 204 selectively disables each indication signal rather than a subset of indication signals which are disabled by INDICATION COUNTER 202. The indication signals which are not masked by INDICATION MASK 204 are then stored in OTHER INDICATION 205 and INDICATION REASON 206.

The third mask is INT MASK 208 which prevents an indication signal from asserting an interrupt to the host. INT MASK 208 prevents indication signals from being stored in OTHER INT 209 or INT REASON 210.

b. Writing to Interrupt Controller Registers

In order for the host to gain access to the registers, INTERRUPT CONTROLLER SELECT must be asserted as illustrated in FIG. 13. This is accomplished by inputting HOST SLAVE ADDRESS [7:6] to logic 220 which is connected to the input of AND gate 222, along with ASIC REGISTER DECODE and HOST SLAVE ACK. AND gate 222 then outputs INTERRUPT CONTROLLER SELECT registers when addresses 1C00(hex) through 1C3C(hex) are being accessed. Logic 220 ensures that HOST SLAVE ACK indicates that no other modules are currently doing autonomous cycles and asserting their select signals. The ASIC REGISTER DECODE indicates that only ASIC registers are being accessed.

The INTERRUPT CONTROLLER SELECT signal is delayed to remove only glitches as illustrated in FIG. 14. In order for DELAYED INTERRUPT CONTROLLER WRITE to be asserted, HOST SLAVE ADDRESS [5] and HOST SLAVE ADDRESS [4] must be either 01 or 10. Logic block 230 requires that the registers to be written to are between 1C10(hex) and 1C2C(hex). HOST SLAVE ADDRESS [4:5] is inputted to logic block 230 with the output of logic block 230 inputted to AND gate 231, along with INTERRUPT CONTROLLER SELECT. In addition, HOST LOW BYTE EN and HOST WRITE are inputted to AND gate 231. The output of AND gate 231 is INTERRUPT CONTROLLER WRITE which it is delayed one clock cycle by register 232 which is latched by CLOCK and outputs DELAYED INTERRUPT CONTROLLER WRITE at the Q output.

HOST SLAVE ADDRESS [4:2] along with DELAYED INTERRUPT CONTROLLER WRITE are used to write to the individual register as shown in FIG. 16. DELAYED INTERRUPT CONTROLLER WRITE and CYCLE DONE are inputted into AND gate 240 to generate INTERRUPT CONTROLLER WRITE STROBE which is inputted to E input of multiplexer 242. HOST SLAVE ADDRESS [4:2] is inputted to the D input of register 241 which is latched by CLOCK. The output of register 241 is DELAYED HOST SLAVE ADDRESS [4:2] which is inputted to S[2:0] of multiplexer 242. DELAYED HOST SLAVE ADDRESS [4:2] selects the appropriate register in which INTERRUPT CONTROLLER WRITE STROBE will be multiplexed. The write strobe outputs include: RCV INDICATE WRITE STROBE, INIT REQUEST WRITE STROBE, INDICATION MASK WRITE STROBE, INT MASK WRITE STROBE, INDICATION OFF WRITE STROBE, and INDICATION ON WRITE STROBE. Outputs E2 and E3 are not used.

FIG. 15 shows a table of codes used for DELAYED HOST SLAVE ADDRESS [4:2] in selecting a register.

The INDICATION MASK register 250 and INT MASK register 251 are shown in FIG. 17. INDICATION MASK WRITE STROBE is used to clock INDICATION MASK register 250 while HOST WRITE DATA [6:1] is inputted to the D inputs of INDICATION MASK register 250 and INT MASK register 251. The falling edge of the write strobe, which corresponds to the falling edge of CYCLE DONE, is used to latch the data. However, the falling edge of the INT MASK WRITE STROBE signal is used as the clock to latch HOST WRITE DATA [6:1] in INT MASK register 251. INTERRUPT CONTROLLER RESET is used to reset registers 250 and 251.

REQUESTED INT in FIG. 18 is asserted when the INT REQUEST WRITE STROBE is asserted. REQUESTED INT is deasserted when the interrupt is acknowledged by reading the INT REQUEST register. Writing and reading of the INT REQUEST register will set and reset REQUESTED INT. The INT REQUEST WRITE STROBE clocks register 260 which outputs REQUESTED INT at the Q output with the D-input set to 1. DELAYED INT REQUEST READ and CYCLE DONE are entered into AND gate 261 which outputs INT REQUEST READ STROBE to OR gate 262 along with INTERRUPT CONTROLLER RESET. The output of OR gate 262 is then used to reset register 260.

The generation of the DELAYED RCV DONE WRITE signal, as shown in FIG. 19, indicates when RCV DONE is written to. HOST SLAVE ADDRESS [7:2] is entered into logic block 265 in order to determine whether the RCV DONE register has been selected. The output of logic block 265 is then entered into AND gate 266 along with ASIC REGISTER DECODE, HOST WRITE, HOST SLAVE ACK, and HOST LOW BYTE EN. The output of AND gate 266 is RCV DONE WRITE which is delayed one clock cycle to provide glitch-free operation by inputting the signal into the D-input of register 267 synchronized by CLOCK which then outputs DELAYED RCV DONE WRITE at the Q-output.

Figure 20:
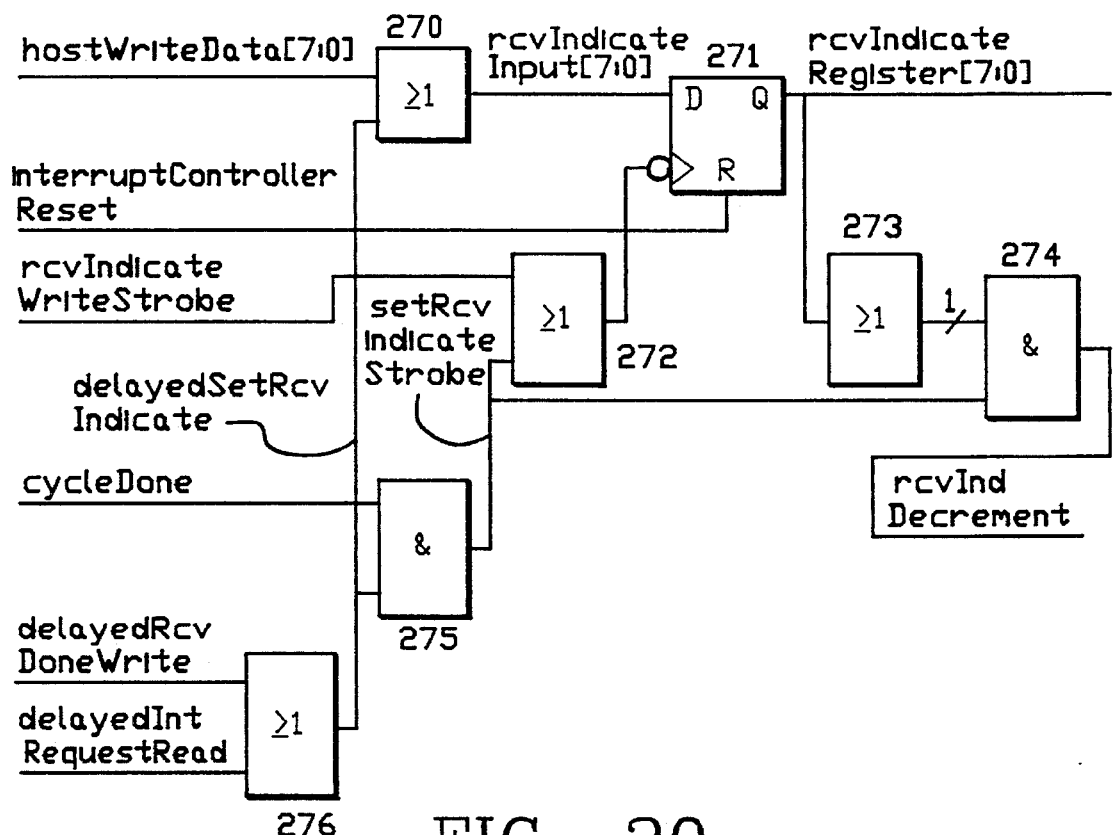
FIG. 20 is a schematic illustrating the generating of the RCV INDICATE register signals.

FIG. 20 illustrates the generation of RCV INDICATE REGISTER [7:0]. The value of RCV INDICATE REGISTER [7:0] changes when the host writes to the RCV INDICATE register or the host writes to RCV DONE register or reads from INT REQUEST register. If the host writes to the RCV INDICATE register, as indicated by the RCV INDICATE WRITE STROBE signal inputted into OR gate 272, the data on HOST WRITE DATE [7:0] is stored in register 271 as RCV INDICATE INPUT [7:0]. If the host writes to RCV DONE register, as indicated by the DELAYED RCV DONE WRITE signal inputted to OR gate 276, the value FF(hex) is stored in RCV INDICATE register 271. If the host reads the INT REQUEST register, as indicated by the DELAYED INT REQUEST READ signal inputted to OR gate 271, the value FF(hex) is stored in RCV INDICATE register 271.

The output of OR gate 276, DELAYED SET RCV INDICATE, is input to AND gate 275 with CYCLE DONE to create a strobe, called the SET RCV INDICATE STROBE. SET RCV INDICATE STROBE is input to OR gate 272 with RCV INDICATE WRITE STROBE, creating a strobe that goes from high to low whenever a new value should be loaded into RCV INDICATE register. INTERRUPT CONTROLLER RESET resets RCV INDICATE register 271.

To implement the requirement that the INDICATION COUNTER be decremented when the RCV INDICATE register contains a non-zero value and RCV DONE is written to or INT REQUEST is read, the output of RCV INDICATE register is input to OR gate 273. The output OR gate 273 is input to AND gate 274 with the SET RCV INDICATE STROBE to output RCV IND DECREMENT. RCV IND DECREMENT is used to decrement INDICATION COUNTER.

C. Generating Interrupt Controller Requests

Figure 21:
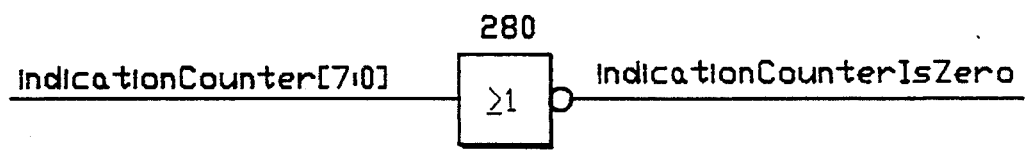
FIG. 21 is a schematic illustrating how the signal for identifying when the indication counter is zero is generated.

The REQUESTED INT, EARLY RCV, and RCV COMPLETE interrupts may be masked if the INDICATION COUNTER is non-zero. FIG. 21 shows a schematic generating INDICATION COUNTER IS ZERO which is used to determine when INDICATION COUNTER is zero. INDICATION COUNTER IS ZERO is asserted by ORing all of the bits of INDICATION COUNTER [7:0] and inverting the result by OR gate 280.

Figure 22:
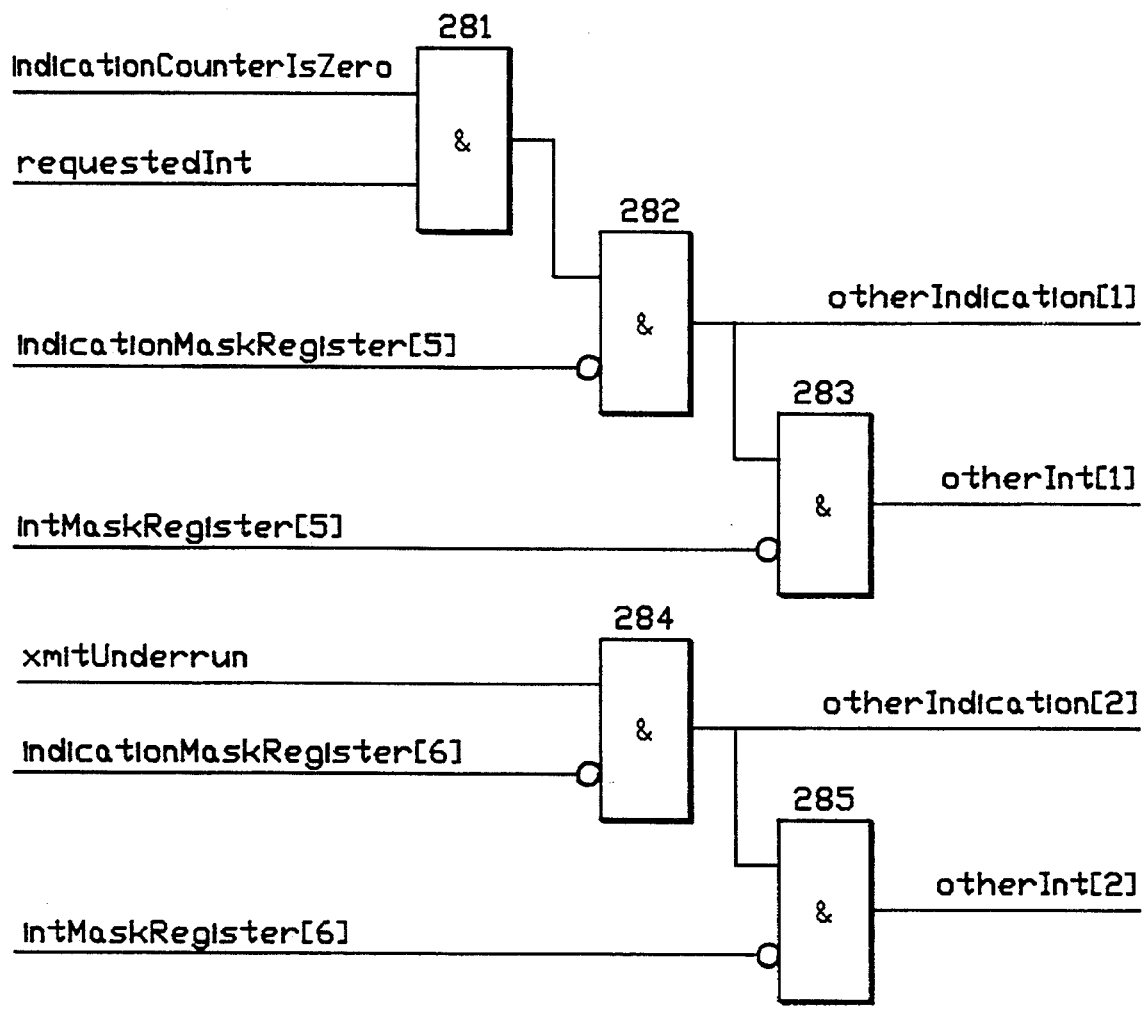
FIG. 22 is a schematic illustrating the generation of the other indication and other interrupt signals.

FIG. 22 is a schematic representation of how the values for OTHER INDICATION and OTHER INT registers are generated. The OTHER INDICATION and OTHER INT registers are formed by ANDing the REQUESTED INT and XMIT UNDER RUN signals to mask values. INDICATION COUNTER IS ZERO and REQUESTED INT are entered into AND gate 281. The output of AND gate 281 is then fed into AND gate 282 along with INDICATION MASK REGISTER [5]. The output of AND gate 282 is OTHER INDICATION [1]. INT MASK REGISTER [5] is inputted into AND gate 283 along with OTHER INDICATION [1]. The output of AND gate 283 is OTHER INT [1]. XMIT UNDER RUN and INDICATION MASK REGISTER [6] are inputted to AND gate 284 to output OTHER INDICATION [2]. INT MASK REGISTER [6] is inputted to AND gate 285 along with OTHER INDICATION [2] to output OTHER INT [2].

Figure 23:
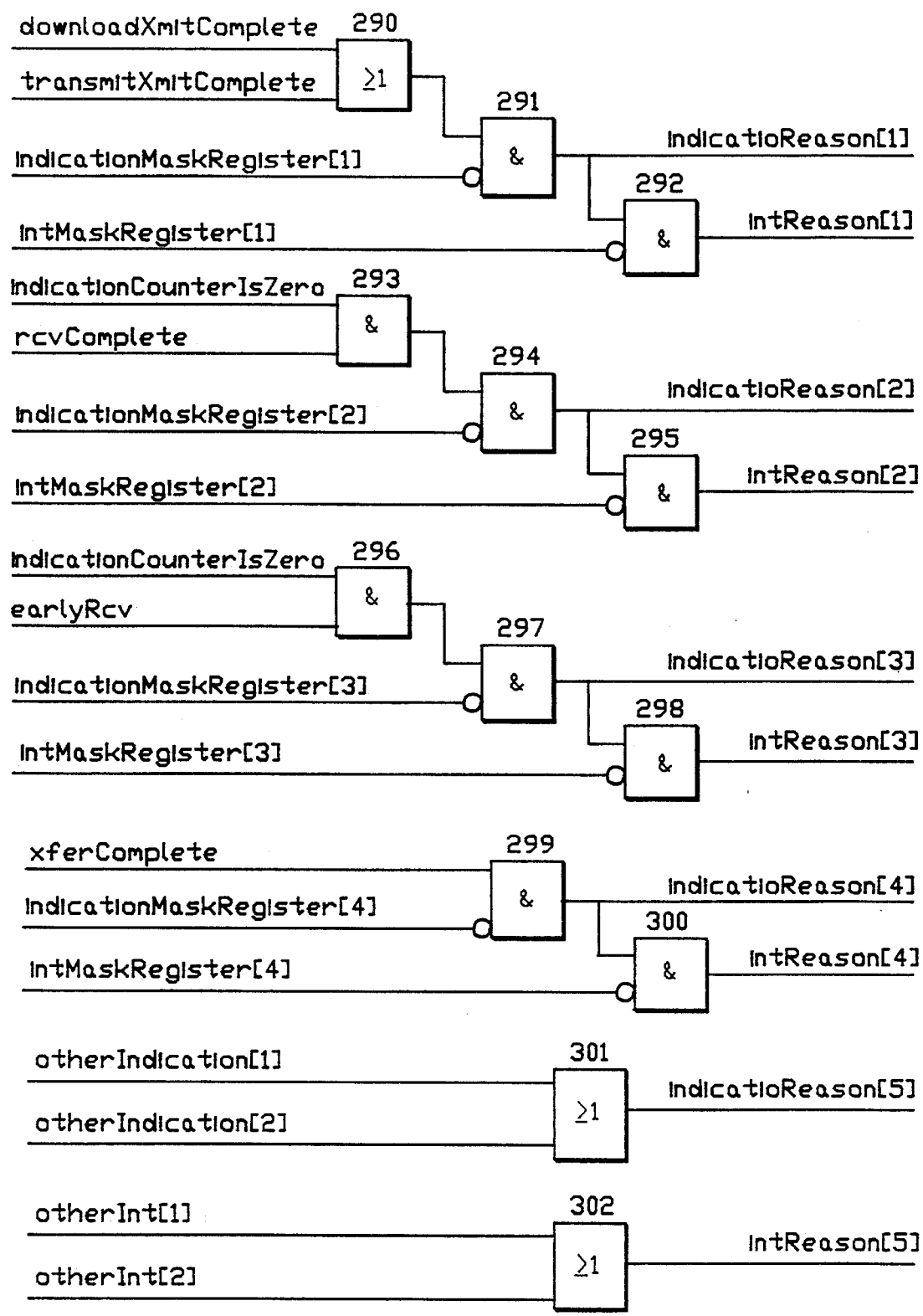
FIG. 23 is a schematic illustrating the generation of the indication reason and interrupt reason signals.

The generation of the values in the INDICATION REASON and INT REASON registers are formed similarly to the OTHER INDICATION and OTHER INT registers described above. FIG. 23 shows the generation of INDICATION REASON and INT REASON register values. DOWNLOAD XMIT COMPLETE along with TRANSMIT XMIT COMPLETE is entered to OR gate 290 with the output entered to AND gate 291 along with INDICATION MASK REGISTER [1]. The output of AND gate 291 is the first bit value of INDICATION REASON [1]. INT MASK REGISTER [1] is then entered into AND gate 292 along with INDICATION REASON [1] to output INT REASON [1]. Similarly, INDICATION COUNTER IS ZERO and RCV COMPLETE are inputted into AND gate 293 with the output fed to AND gate 294 along with INDICATION MASK REGISTER [2]. The output of AND gate 294 is then INDICATION REASON [2] which is also inputted into AND gate 295 along with INT MASK REGISTER [2]. The output of AND gate 295 is then INT REASON [2].

INDICATION COUNTER IS ZERO and EARLY RCV are inputted into AND gate 296 with the output fed to AND gate 297. The other input to AND gate 297 is INDICATION MASK REGISTER [3] with the output being INDICATION REASON [3]. INT REASON [3] is generated by INDICATION REASON [3] and which are inputted to AND gate 298 INT MASK REGISTER [3].

XFER COMPLETE and INDICATION MASK REGISTER [4] are entered into AND gate 299 to output INDICATION REASON [4]. INT MASK REGISTER [4] and INDICATION REASON [4] are inputted into AND gate 300 to output INT REASON [4]. INDICATION REASON [5] and INT REASON [5] are generated by OR gates 301 and 302 which have inputs of OTHER INDICATION [1], OTHER INDICATION [2], OTHER INT [1] and OTHER INT [2] as inputs, respectively.

FIG. 24 is a schematic illustrating the creation of GENERATE AN INTERRUPT signal. When any of the signals in the INT REASON [5:1] are asserted, the GENERATE AN INTERRUPT signal is asserted by entering INT REASON [5:1] into OR gate 303.

FIG. 25 is a schematic illustrating the generation of the INTERRUPT REQUEST signals. To create an interrupt request on INTERRUPT REQUEST 9–12 or PRIVATE INTERRUPT, CARD ENABLE must be asserted. CARD ENABLE and GENERATE AN INTERRUPT are inputted to AND gate 305 with the output inputted to the Y-input of multiplexer 306. PRIVATE INT SELECT is inputted into the S-input of multiplexer 306. PRIVATE INT SELECT is used to determine if the interrupt will be routed to the PRIVATE INTERRUPT signal or one of the INTERRUPT REQUEST 9–12 signals. The 0 output of multiplexer 306 is inputted to the Y-input of multiplexer 304 while the 1 output of multiplexer 306 is the PRIVATE INTERRUPT signal. If the interrupt should be generated on one of the INTERRUPT REQUEST 9–12 signals, INTERRUPT SELECT [1:0] which is inputted to S[1:0] of multiplexer 304 are used to determine the level of interrupt selected. Outputs 0–3 of multiplexer 304 are INTERRUPT REQUEST 9, INTER- RUPT REQUEST 10, INTERRUPT REQUEST 11, and INTERRUPT REQUEST 12, respectively.

d. Reading Interrupt Controller Registers

In order for the host to read data from the interrupt controller registers, it must first provide an appropriate address of the register on HOST SLAVE ADDRESS [5:2] at the S[3:0] input of multiplexer 310 as shown in FIG. 26. The interrupt controller drives RAW INTERRUPT DATA [7:0] at the Y-output of multiplexer 310 with the data from the register selected by HOST SLAVE ADDRESS [5:2]. INDICATION REASON [5:1] is inputted to the 0 input of multiplexer 310. Likewise, INT REASON [5:1], OTHER INDICATION [2:1], OTHER INT [2:1], INDICATION MASK REGISTER [6:1], and INT MASK REGISTER [6:1] are inputted to 1 through 5 inputs of multiplexer 310, respectively. RCV INDICATES REGISTER [7:0] and INDICATION COUNTER [7:0] are inputted to the 8 and 10 inputs of multiplexer 310. The remaining inputs are set to 0.

FIG. 27 illustrates how RAW INTERRUPT DATA [7:0] does not change during a read. The HOST SLAVE ACK is inputted to the D-input of register 316 which is synchronized by CLOCK to output DELAYED HOST SLAVE ACK on the Q-output which is fed to the D-input of register 317 which is also synchronized by CLOCK. The HOST SLAVE ACK is delayed two clock cycles to create DELAYED HOST SLAVE ACK and DOUBLE DELAYED HOST SLAVE ACK which is used to latch RAW INTERRUPT DATA [7:0]. This insures that INTERRUPT DATA [7:0] which is outputted from Q output of register 315 will not change around the time CYCLE DONE is asserted.

The DELAYED INT REQUEST READ signal in FIG. 28 indicates when the INT REQUEST register is read. INTERRUPT CONTROLLER SELECT, HOST LOW BYTE EN, and HOST WRITE are entered into AND gate 320 to output INTERRUPT CONTROLLER READ. INTERRUPT CONTROLLER READ is then entered into the D-type flip-flop register 321 which is synchronized by CLOCK and outputs at the Q output DELAYED INTERRUPT CONTROLLER READ which is entered into AND gate 324. HOST SLAVE ADDRESS [5:2] is then entered into logic 322 and outputs INT REQUEST ADDRESS when the HOST SLAVE ADDRESS [5:2] accesses the INT REQUEST register. INT REQUEST ADDRESS is then inputted to the D-input of flip-flop register 323 synchronized by CLOCK which outputs at the Q output DELAYED INT REQUEST ADDRESS to AND gate 324. DELAYED INT REQUEST READ is then outputted from AND gate 324.

FIG. 29 is a schematic illustrating the interrupt controller's 8-bit indication counter. The counter is incremented when the INDICATION OFF register is written to and decremented when the INDICATION ON register is written to. INDICATION OFF WRITE STROBE which is entered into OR gate 334 indicates whether the INDICATION OFF register is written to, while the INDICATION ON WRITE STROBE signal which is entered into OR gate 335 indicates when the INDICATION ON register is written to. The counter is also decremented when the RCV DONE register is written to or the INT REQUEST register is read while the RCV INDICATE register contains a non-zero value. INTERRUPT CONTROLLER RESET is inputted to OR gate 334 and OR gate 335. RCV IND DECREMENT is also inputted to OR gate 335. The output of OR gate 334 and 335 are inputted to the S0 and S1 inputs of multiplexer 332, respectively.

INDICATION COUNTER [7:0] is fed back to logic 330 and 331 which outputs IND COUNT PLUS ONE [7:0] and IND COUNT MINUS ONE [7:0] to 1 input and 2 input of multiplexer 332, respectively. INDICATION COUNTER [7:0] is also fed back to the 0 input and the 3 input of multiplexer 332 which in turn outputs at the S output NEXT INDICATION COUNTER [7:0] to the D-input of register 333 which is synchronized by CLOCK and outputs INDICATION COUNTER [7:0] at the Q output.

When the counter is at zero and one of the decrement signals is asserted, the counter remains a zero and is not decremented to FF(hex). Similarly, when the counter is at FF(hex) and an increment signal is asserted, the counter remains at FF(hex) and is not incremented to zero.

IX. Conclusion

Therefore, the present invention allows the host to enable and/or disable indications and interrupts of network adapter asynchronous events. The network adapter includes an interrupt controller module which has interrupt and indication logic which enables and/or disables indication or interrupt signals. The interrupt and indication logic includes three host accessible registers which are used for masking indication and interrupt signals to the host. In addition, the interrupt and indication logic includes four memory locations containing values indicating the occurrence of asynchronous events.

INDICATION COUNTER, INDICATION MASK and INT MASK are registers used to selectively disable or enable indication and interrupt signals. INDICATION COUNTER is used to disable or enable the REQUESTED INT, EARLY RCV and RCV COMPLETE subset of indication signals. This subset of network adapter indication signals may generate an interrupt which cannot be serviced by a host processor during a host frame reception subroutine. Moreover, an internal indication counter may automatically enable or disable this subset of indication signals without explicit writes to INDICATION COUNTER. The automatic disabling or enabling may be overridden by explicit writes to INDICATION OFF or INDICATION ON.

INDICATION MASK is used to selectively disable the above individual indication signals as well as XMIT UNDER RUN, XFER COMPLETE and XMIT COMPLETE.

Finally, INT MASK is used to selectively disable indication signals preventing the generation of interrupt signals corresponding to individual indication signals.

OTHER INDICATION, INDICATION REASON, OTHER INT and INT REASON are memory locations in the interrupt and indication logic which may be read by the host. These memory locations contain indications and interrupt values representing network adapter asynchronous events. OTHER INDICATION and INDICATION REASON contain values representing the indication signals which have not been masked by INDICATION COUNTER and INDICATION MASK. OTHER INT and INT REASON contain interrupt values which generate a host interrupt signal not masked by INT MASK.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for managing an indication signal supplied by a source of indication signals to present an interrupt signal to a host, comprising:
   a first mask logic for receiving the indication signal and which selectively masks at least a portion of the indication signal to output an indication value;
   a first memory location, coupled to the first mask logic, for storing the indication value;
   a second mask logic, coupled to the first memory location, for receiving the indication value from said first memory location and which selectively masks at least a portion of the indication value to output an interrupt value;
   a second memory location, coupled to the second mask logic, for storing the interrupt value; and
   interrupt means, coupled to the second memory location and responsive to the interrupt value from said second memory location, for generating the interrupt signal to the host.

2. The apparatus of claim 1, wherein the first memory location is also coupled to the host for processing the indication value by the host.

3. The apparatus of claim 1, wherein the second memory location is also coupled to the host for processing the interrupt value by the host.

4. The apparatus of claim 1, wherein the first and second memory locations are coupled to the host for processing the indication value and the interrupt value by the host in response to an interrupt signal.

5. The apparatus of claim 1, wherein the host comprises a first condition and a second condition, the apparatus further comprising:
   a first mask, including a first mask memory location, coupled to the host, the first mask memory location responsive to a write by the host during the first condition, for storing the first mask, and wherein the first mask logic is responsive to the first mask; and
   a second mask, including a second mask memory location, coupled to the host, the second mask memory location responsive to a write by the host during the second condition, for storing the second mask, and wherein the second mask logic is responsive to the second mask.

6. The apparatus of claim 1, further comprising a first mask, coupled to the first mask logic, wherein the first mask logic is responsive to the first mask, and includes a first mask memory location, coupled to the host, the first mask memory location responsive to a write by the host for storing the first mask.

7. The apparatus of claim 6, wherein the first mask logic includes:
   an AND gate having at least a first and second input and an output, the first input coupled to the indication signal, the second input coupled to the first mask memory location, and the output coupled to the first memory location for storing the indication value.

8. The apparatus of claim 1, further comprising a second mask, coupled to the second mask logic, wherein the second mask logic is responsive to the second mask, and includes a second mask memory location, coupled to the host, the second mask memory location responsive to a write by the host for storing the second mask.

9. The apparatus of claim 8, wherein the second mask logic includes:
   an AND gate having at least a first and a second input and an output, the first input coupled to the first memory location, the second input coupled to the second mask memory location, and the output coupled to the second memory location for storing the interrupt value.

10. An apparatus for managing a plurality of indication signals supplied by a source of indication signals to present an interrupt signal to a host having a host processor with an interrupt service routine and a host data bus, comprising:
    counter mask logic for receiving the plurality of indication signals, which selectively masks at least a subset of the plurality of indication signals, and which outputs a set of counter masked indication signals;
    indication mask logic, coupled to the counter mask logic, for receiving said set of counter masked indication signals and which selectively masks said set of counter masked indication signals to output an indication value;
    an indication memory location, coupled to the indication mask logic, for storing the indication value;
    interrupt mask logic, coupled to the indication memory location, for receiving at least a portion of the indication value and which selectively masks at least a portion of the indication value to output an interrupt value;
    an interrupt memory location, coupled to the interrupt mask logic, for storing the interrupt value; and
    interrupt means, coupled to the interrupt memory location and responsive to the interrupt value, for generating the interrupt signal on the host data bus to the host processor.

11. The apparatus of claim 10, wherein the indication memory location and interrupt memory location are coupled to the host processor for processing the indication value and the interrupt value by the host processor during the interrupt service routine.

12. The apparatus of claim 10, wherein the indication mask logic includes a first register and the interrupt mask logic includes a second register, said first register and said second register being coupled to the host processor, said first register for selectively masking said set of counter mask indicators responsive to a first write from said host processor, said second register for selectively masking said indication value responsive to a second write from said host processor.

13. The apparatus of claim 10, wherein the host includes host software having a subroutine and the counter mask logic includes:
    means for masking the subset of the plurality of indication signals responsive to a host signal generated by the subroutine; and
    means for unmasking the subset of the plurality of indication signals responsive to the host signal generated by the subroutine.

14. An apparatus for managing a plurality of indication signals supplied by a source of indication signals to present an interrupt signal to a host having a host processor with an interrupt service routine and a host data bus, comprising:
    counter mask logic for receiving the plurality of indication signals at least a subset of the plurality of indication signals, and for outputting a set of counter masked indication signals;
    indication mask logic, coupled to the counter mask logic, for receiving said set of counter masked indication signals and which selectively masks said set of counter masked indication signals to output an indication value;

an indication memory location, coupled to the indication mask logic, for storing the indication value;

interrupt mask logic, coupled to the indication memory location, for receiving at least a portion of the indication value and capable of selectively masking at least a portion of the indication value to output an interrupt value;

an interrupt memory location, coupled to the interrupt mask logic, for storing the interrupt value; and interrupt means, coupled to the interrupt memory location and responsive to the interrupt value, for generating the interrupt signal on the host data bus to the host processor, wherein the host includes host software having a plurality of subroutines and the counter mask logic includes:

a counter memory location containing a counter value;

means for incrementing the counter value in the counter memory location responsive to a first host signal generated by at least a first subroutine;

means for decrementing the counter value in the counter memory location responsive to a second host signal generated by at least a second subroutine; and means for masking the subset of the portion of the plurality of indication signals responsive to the counter value in the counter memory location.

15. The apparatus of claim 14, wherein the counter memory location is included in a counter memory, said counter memory comprises a plurality of memory cells, each memory cell coupled to an OR gate having an output signal masking the subset of the plurality of indication signals responsive to a counter memory value.

16. The apparatus of claim 15, wherein the means for masking the subset of the plurality of indication signals includes a plurality of AND gates, individual AND gates having at least a first and second input and an output, the first input coupled to the subset of the plurality of indication signals and the second input coupled to receive the output signal of the OR gate masking at least the subset of the indication signal at the output of individual AND gates responsive to a counter memory value.

17. A network adapter for transferring data between a network transceiver coupled with a network, and a host system having a host processor, the network adapter generating a plurality of indication signals in response to network adapter events for management by the host processor to present an interrupt signal to the host processor, comprising:

counter mask logic for receiving the plurality of indication signals and capable of selectively masking at least a subset of the plurality of indication signals, the counter mask logic having a first register for selectively masking the subset of the plurality of indication signals responsive to the host processor writing to the first register;

indication mask logic, coupled to the counter mask logic, for receiving individual indication signals from among the portion of the plurality of indication signals and capable of selectively masking the individual indication signals to output individual indication values, the indication mask logic having a second register for selectively masking the individual indication signals responsive to a write by the host processor to the second register;

an indication memory location, coupled to the indication mask logic, for storing the individual indication values and for reading by the host processor;

interrupt mask logic, coupled to the indication memory location, for receiving the individual indication values and capable of selectively masking individual indication values, the interrupt mask logic having a third register for selectively masking individual indication values to output an interrupt value responsive to a write by the host processor to the third register;

an interrupt memory location, coupled to the interrupt mask logic, for storing the interrupt value and for reading by the host processor; and interrupt means, coupled to the interrupt memory location, for generating the interrupt signal to the host processor responsive to the interrupt value, wherein the host includes host software having a plurality of subroutines and the counter mask logic includes:

means for incrementing a counter value in the first register responsive to a first host signal generated by at least a first subroutine; and means for decrementing the counter value in the first register responsive to a second host signal generated by at least a second subroutine.

18. The apparatus of claim 17, wherein the first register comprises a plurality of memory cells, each memory cell coupled to an OR gate having an output signal masking the subset of the plurality of indication signals responsive to the counter value.

19. The apparatus of claim 17, wherein the counter value in the first register is between 0 and a positive number.

20. A network adapter for transferring data between a network transceiver, coupled with a network, and a host system having a host processor and host software subroutines, the network adapter generating a plurality of indication signals in response to the transferring of data for management by the host processor to present an interrupt signal to the host processor, comprising:

counter mask logic for receiving the plurality of indication signals and which selectively masks at least a subset of the plurality of indication signals, the counter mask logic having a first register for selectively masking the subset of the plurality of indication signals responsive to the host processor writing to the first register during a host software subroutine;

indication mask logic, coupled to the counter mask logic, for receiving individual indication signals from among the plurality of indication signals and which selectively masks the individual indication signals to output individual indication values, the indication mask logic having a second register for selectively masking the individual indication signals responsive to a write by the host processor to the second register;

a first indication memory location, coupled to the indication mask logic, for storing the individual indication values representing high priority individual indication signals and for reading by the host processor during a host software subroutine;

a second indication memory location, coupled to the indication mask logic, for storing the individual indication values representing low priority individual indication signals and for reading by the host processor during a host software subroutine;

interrupt mask logic, coupled to the first and second indication memory locations, for selectively disabling individual indication values that were not disabled by the indicating mask logic, the interrupt mask logic having a third register selectively disabling individual indication values responsive to a write by the host processor to the third register;

a first interrupt memory location, coupled to the interrupt mask logic, for storing an interrupt value representing individual high priority indication values and for reading by the host processor;

a second interrupt memory location, coupled to the interrupt mask logic, for storing an interrupt value representing individual low priority indication values and for reading by the host processor; and interrupt means, coupled to the first and second interrupt memory locations, for generating the interrupt signal to the host processor responsive to the interrupt value.

21. A method for managing transfer of signals from a network interface device to a host system, the signals indicating events detected by the network interface device, comprising:

said network interface device identifying events detected by the network interface device about which the host should have knowledge;

selectively masking at least a portion of the events with a first mask to output a first indication signal, said host system being coupled to receive said first indication signal;

selectively masking at least a portion of the first indication signal with a second mask to output a second indication signal, said host system coupled to receive said second indication signal as an interrupt; and communicating an interrupt signal to the host system in response to said second indication signal.

22. The method of claim 21, further comprising dynamically altering the first and second masks in response to activity in the host.

23. A method of managing indication signals by a host processor, the indication signals generated from a network adapter in response to data transfer events occurring at the network adapter, comprising:

providing the indication signals along a portion of a data path between the network adapter and the host processor;

selectively masking at least a subset of the indication signals at a first mask, the first mask having a first mask pattern, to output a set of first masked signals;

at a first time, said host processor reading said set of first masked signals; selectively masking at least a subset of the first masked signals at a second mask, the second mask having a second mask pattern, to output a set of second masked signals; and at a second time, presenting a host interrupt signal to the host processor in response to the second masked signals.

24. The method of claim 23, further comprising:

controlling, by the host processor, the first mask pattern and the second mask pattern of the first mask and the second mask, respectively, to control the selective masking steps at the first mask and the second mask.

25. The method of claim 24, further comprising:

storing the set of first masked signals and the set of second masked signals at a memory location.

26. The method of claim 25, wherein the step of storing comprises:

storing the set of first masked signals at a first memory location; and storing the set of second masked signals at a second memory location.

27. The method of claim 25, wherein the step of presenting the host interrupt signal to the host processor is accomplished by the host processor reading the memory location.

28. The method of claim 24, including generating the host interrupt signal in response to the second masked signals and reading the first masked signals to learn of events not subject of host interrupt signals.

29. A system comprising:

a processor having an interrupt input; and a network adapter device comprising, an indication signal generator having a plurality of indication signal outputs, an indication signal being generated in response to a network communications event, an indication signal mask device coupled to said plurality of indication signal outputs and coupled to receive an indication signal mask, said indication signal mask device having a plurality of masked indication signal outputs, a masked indication signal being selectively generated in response to receiving a corresponding indication signal from said indication signal generator and a corresponding portion of said indication signal mask being set to a first value, said masked indication signal outputs being coupled to said processor, an interrupt signal mask device coupled to said plurality of masked indication signal outputs and coupled to receive an interrupt signal mask, said interrupt signal mask device having a plurality of masked interrupt signal outputs, a masked interrupt signal being selectively generated in response to receiving a corresponding masked indication signal and a corresponding portion of said interrupt signal mask being set to a second value, and an interrupt generator coupled to said plurality of masked interrupt signal outputs and having an interrupt signal output, an interrupt signal corresponding to said network communications event being generated in response to receiving a masked interrupt signal.

30. The network adapter device of claim 29 further comprising:

an indication signal memory coupled to said indication signal mask device for storing an indication value corresponding to said masked indication signals received from said indication signal mask device.

* * * * *